US008043556B2

(12) United States Patent  
Peel et al.

(10) Patent No.: US 8,043,556 B2
(45) Date of Patent: Oct. 25, 2011

(54) ABLUTIONARY INSTALLATIONS

(75) Inventors: Kevin Peel, Abbeymead (GB); Timothy James Shepherd, Cirencester (GB); Geoffrey Hawke Whale, Nailsworth (GB); Paul Vigars, Fishponds (GB); Nicholas John Beck, Tewkesbury (GB)

(73) Assignee: Kohler Mira Limited, Gloucestershire (GB)

( * ) Notice: Subject to any disclaimer, the term of this patent is extended or adjusted under 35 U.S.C. 154(b) by 707 days.

(21) Appl. No.: 11/795,390

(22) PCT Filed: Jan. 18, 2006

(86) PCT No.: PCT/GB2006/000159
§ 371 (c)(1),
(2), (4) Date: Jan. 31, 2008

(87) PCT Pub. No.: WO2006/077396
PCT Pub. Date: Jul. 27, 2006

(65) Prior Publication Data
US 2008/0112843 A1 May 15, 2008

(30) Foreign Application Priority Data
Jan. 18, 2005 (GB) .................. 0500970.9

(51) Int. Cl.
*A61L 2/00* (2006.01)
*F16K 31/00* (2006.01)
*G01D 11/26* (2006.01)
*B01D 21/30* (2006.01)
*B01D 35/18* (2006.01)
*E03B 1/00* (2006.01)
*E03B 7/07* (2006.01)
*G05D 11/00* (2006.01)
*G05D 23/13* (2006.01)

(52) U.S. Cl. .............. 422/1; 422/38; 422/107; 422/108; 422/114; 422/116; 422/119; 422/260; 210/149; 210/175; 210/742; 210/739; 210/749; 210/764; 210/766; 210/85; 210/143; 137/3; 137/88; 137/87.03; 137/337; 137/455; 137/551; 236/12.1; 236/191 R

(58) Field of Classification Search .............. 422/1, 38, 422/107, 108, 114, 116, 119, 260; 210/149, 210/175, 742, 739, 749, 764, 766, 85, 143; 137/3, 88, 87.03, 337, 455, 551; 236/12.1, 236/191 R
See application file for complete search history.

(56) References Cited

U.S. PATENT DOCUMENTS
4,923,116 A 5/1990 Homan
5,294,045 A 3/1994 Harris
(Continued)

FOREIGN PATENT DOCUMENTS
DE 40 39 623 A1 6/1992
JP 10311078 11/1998
JP 10328668 12/1998
(Continued)

OTHER PUBLICATIONS
Office Action dated Apr. 27, 2011 from the Japanese Patent Office in Japanese patent application No. 2007-550856.

*Primary Examiner* — Jill Warden
*Assistant Examiner* — Monzer Chorbaji
(74) *Attorney, Agent, or Firm* — Greer, Burns & Crain, Ltd.

(57) ABSTRACT

An ablutionary installation including a mixing valve having respective inlets for hot and cold water and an outlet for temperature controlled water, a temperature sensor for monitoring outlet water temperature and providing a signal representative of the outlet water temperature to an electronic controller, a user interface permitting selection of outlet water temperature up to a pre-determined temperature, the electronic controller being operable to compare the selected and sensed outlet water temperatures for controlling the mixing valve to adjust the ratio of hot and cold water delivered to the outlet according to the selected outlet water temperature, and apparatus for initiating a disinfection cycle to deliver water to the outlet at a temperature higher than the pre-determined temperature, wherein the initiating apparatus includes an operating sequence with at least two inputs.

5 Claims, 23 Drawing Sheets

U.S. PATENT DOCUMENTS

| | | | |
|---|---|---|---|
| 2002/0050478 A1* | 5/2002 | Talbert et al. | 210/742 |
| 2002/0153425 A1 | 10/2002 | Mountford et al. | |
| 2002/0179723 A1 | 12/2002 | Wack et al. | |
| 2004/0149831 A1* | 8/2004 | Sheeran et al. | 236/12.1 |

FOREIGN PATENT DOCUMENTS

| | | |
|---|---|---|
| JP | 2004024513 | 1/2004 |
| WO | WO 97/00470 | 1/1997 |
| WO | WO 02/12760 A1 | 2/2002 |

* cited by examiner

ABLUTIONARY INSTALLATIONS

CROSS-REFERENCES TO RELATED APPLICATIONS:

This Application is a 371 of PCT/GB06/00159 filed on Jan. 18, 2006.

BACKGROUND

This invention concerns improvements in or relating to ablutionary installations for washing such as baths, showers, washbasins and the like.

The invention has particular, but not exclusive application to single or multiple outlet installations such as may be employed both domestically in the home and commercially in a variety of situations including hotels, healthcare and leisure establishments.

Typical installations for showering in healthcare and leisure establishments employ thermostatic mixing valves for mixing and blending supplies of hot and cold water to provide a source of temperature controlled water. Such installations carry risks associated with the safe operation of the mixing valve to avoid the user being scalded by discharge of very hot water and with the reliable disinfection of the waterways to prevent the user being infected by the presence of bacteria in the water supply, especially legionella bacteria.

Accurate control of the outlet water temperature is therefore required in such installations to reduce the risk of scalding. Electronic thermostatic mixing valves are known that employ a control system including a temperature sensor to monitor the outlet water temperature and an electric motor to adjust the position of the proportioning valve to maintain the selected water temperature substantially constant.

These valves can provide a fast response to change in temperature of the outlet water but the known electronic thermostatic mixing valves can tend to instability where the pressures of the hot and cold water supplies are unequal. Various attempts have been made to improve stability while maintaining accurate temperature control.

One method used to keep an electronic thermostatic mixing valve stable is to build in a level of damping in the valve rate of correction. This has the disadvantage that the valve becomes sluggish in response and so a compromise has to be selected wherein the accuracy of control and damping are satisfactory for a specific set of operating conditions, including the specification of the shower spray to be used.

Another method is to provide a motorised addition to the control knob of a thermostatic mixing valve employing a thermostat containing a thermally responsive material where the filled thermostat deals with adverse inlet pressure changes whilst remaining stable and the electronic addition makes very small, damped adjustments to the mixing valve temperature selector knob to compensate for the small residual errors. The component count in this type of valve is quite high because there is a complete mechanical control system plus an electronic control system so the product cost is consequently moderately high.

A potential solution to these problems involves employing sensors for the pressure, temperature and flow rate of the hot and cold water at the inlets and the blended water at the outlet and to adjust the ratio of hot and cold water delivered to the outlet in response to change in any of these affecting the outlet water temperature. The provision of sensors for all these parameters adds considerably to manufacturing costs and adds to the complexity of the electronic control required to process the signals and generate a correction signal.

It is common practice for a trained technician to carry out tests on each mixing valve in an installation when it is commissioned and then at regular intervals to ensure that the mixing valves are working properly. This is highly labour intensive and carrying and recording the tests manually incurs significant costs. Moreover, while regular testing may enable a gradual deterioration in the performance of a mixing valve to be detected and rectified before a serious fault develops, such routine testing cannot eliminate the risks of scalding resulting from a catastrophic failure of a mixing valve between tests.

It is also common practice for the installation to be constructed from pipes and fittings that are made from materials approved for use in potable water supply systems with the hot water system maintained at a temperature above 60 degrees C. to kill any organisms and the cold water system kept below 20 degrees C. to prevent any organisms that are present from growing quickly. In this way, the risk of bacteria such as legionella surviving and breeding in the installation is considerably reduced. Problems can still arise, however, if any part of the system is not used for any length of time where water can stagnate in the pipe work allowing any bacteria that are present to grow. As a result, it is necessary to flush the system to prevent water stagnating in the pipe work. This currently requires a service engineer to manually open and close the outlets to flush the water from the pipe work. This is highly labour intensive and there is a risk that parts of the system may not be flushed if any of the outlets are missed which can result in harmful bacteria growing to produce a health risk when the outlet is next opened.

In addition, the installation may be disinfected at predetermined intervals by flushing with water heated above 60° C. for a minimum time sufficient to kill any bacteria present in the waterways. Such elevated water temperatures would produce scalding and requires disinfection to be carried out in a controlled manner when no-one is present in the shower area where they could be exposed to the hot water.

Thermostatic mixing valves for mixing and blending supplies of hot and cold water to provide a source of temperature controlled water are also widely used for showering in domestic and commercial establishments such as hotels. In these installations, the user typically steps into a shower enclosure to operate the mixing valve. When the shower has not been used for some time, a dead leg of cold water between the mixing valve and the shower head is discharged on starting the shower so that the user experiences an initial shot of cold water that may last for several seconds until the water having the selected temperature is delivered to the shower outlet. This can be uncomfortable and may cause the user to adjust the mixing valve to increase the selected water temperature. This may result in water being discharged that is too hot. Although this may not be dangerous for many users, it is uncomfortable and, in the case of young children or the elderly, could cause scalding. This can be a particular problem when young children or the elderly are allowed to shower unsupervised. Often, they are unfamiliar with the operations of the controls and this may lead to inadvertent selection of water that is too hot.

Many users also like to stop the shower while applying soap or shampoo. As a result, the temperature setting of the mixing valve is lost when the valve is turned off and, when the valve is turned on again, the user experiences an initial shot of cooler water until the valve discharges water having the selected temperature. This is uncomfortable and requires the user to remember the valve position to return the shower to the original setting.

SUMMARY

The present invention has been made from a consideration of the foregoing problems and seeks to mitigate at least some of the problems associated with existing installations and/or to provide improvements to the existing installations.

According to a first aspect of the present invention, there is provided an ablutionary installation comprising a mixing valve having respective inlets for hot and cold water and an outlet for temperature controlled water, a primary temperature sensor for monitoring the temperature of the outlet water, a secondary temperature sensor for monitoring the temperature of the outlet water, and means for comparing the temperature of the outlet water detected by the primary temperature sensor and the secondary temperature sensor and controlling the outlet water flow in response thereto.

Preferably, the control means permits flow of outlet water when the difference between the temperature of the outlet water sensed by the primary temperature sensor and the secondary temperature sensor is within a pre-determined limit and prevents flow of outlet water when the difference exceeds the pre-determined limit. In this way, the control means prevents discharge of outlet water having an elevated temperature that could give rise to a risk of scalding.

In a preferred arrangement, the control means operates a valve that is normally open to allow outlet water flow when the temperature difference is within the pre-determined limit and that closes when the temperature difference exceeds the pre-determined limit. For example, the valve may be an on/off solenoid valve that is biased to a closed position when de-energised and is held open against the biasing when energised. As a result, the valve closes both when the temperature difference exceeds the pre-determined limit and if the power supply fails. In this way, the valve fails to a safe condition.

Preferably, the temperature sensed by the primary temperature sensor is employed to control the mixing valve and the temperature sensed by the secondary temperature sensor is employed to check the accuracy of the primary temperature sensor. For example, the primary temperature sensor may be positioned close to the point of mixing of the hot and cold water flowing to the outlet so that transport delays are reduced to provide a rapid response to change in temperature of the outlet water, and the response of the secondary temperature sensor is damped.

In this way, the outlet water temperatures sensed by both sensors will be substantially the same during steady state operation of the system and comparing the outlet water temperatures from both sensors provides a cross-check that enables the water flow to be stopped if a temperature difference is detected that exceeds a pre-determined value. In this way, safe operation of the mixing valve to deliver water having a desired temperature is significantly improved.

The damped response of the secondary temperature sensor relative to the primary temperature sensor may be achieved by employing a sensor with a slower response time as the secondary temperature sensor so that the outlet water temperature sensed by the secondary temperature sensor is effectively an average value of the outlet water temperature sensed by the primary temperature sensor. Where the sensors have different response times they are preferably located at the same position along the waterway so that transport delays are the same for both sensors.

Alternatively, the damped response may be achieved by placing the primary temperature sensor before the secondary temperature sensor and optionally employing a damping chamber between the sensors to smooth out any temperature overshoots that may occur.

Preferably, the mixing valve is operable to adjust the ratio of hot and cold water flowing to the outlet to achieve and maintain the outlet water temperature in accordance with user selection of the outlet water temperature. For example, the mixing valve may include user operable means for inputting a desired outlet water temperature.

Preferably, the mixing valve comprises a valve member adjustable between end positions corresponding to full hot and full cold by an electric motor in response to the outlet water temperature sensed by the primary temperature sensor. The motor may be of any suitable type, for example a stepper motor or a linear piezo motor. In a preferred embodiment, the electric motor is operable by an electronic controller in response to inputs of the user selected outlet water temperature and the outlet water temperature sensed by the primary temperature sensor.

The electronic controller may generate a pulsed signal for driving the motor in a series of steps. The number of steps is preferably chosen to provide adequate temperature resolution under the different operating conditions that may arise in use. In general this may be achieved where the number of pulses to move the valve member between the end positions is of the order of 2500. Temperature resolution may be enhanced by employing part-steps to drive the valve member between the end positions.

In addition, to inputs of the selected and sensed outlet water temperatures, the electronic controller may receive inputs of one or more of water flow rate and pressure at the outlet, water temperature, flow rate and pressure at the inlets, and position of the valve member.

During valve start-up and operation the electronic controller carries out system checks to ensure that it is working properly. In the event that any of these fail the valve closes down.

According to a second aspect of the invention there is provided an ablutionary installation comprising a mixing valve having respective inlets for hot and cold water and an outlet for temperature controlled water, a temperature sensor for monitoring the temperature of the outlet water, and a linear piezo motor responsive to the outlet water temperature for controlling the mixing valve to adjust the ratio of hot and cold water delivered to the outlet according to user selection of the outlet water temperature.

By employing a linear piezo motor to control the mixing valve, the ratio of hot and cold water can be adjusted to provide accurate control of the outlet water temperature. The linear piezo motor has the advantage of little or no backlash compared to other motors such as stepper motors and the associated drive arrangement. As a result, smooth operation and accuracy of response of the mixing valve to adjust the relative proportions of hot and cold water may be enhanced by the use of a linear piezo motor.

According to a third aspect of the present invention there is provided an ablutionary installation comprising a mixing valve having respective inlets for hot and cold water and an outlet for temperature controlled water, the outlet being provided with a plurality of on/off valves arranged in parallel and means for selectively operating one or more on/off valves to adjust the outlet flow rate.

By employing on/off valves to control flow rate, adjustment of flow rates is simple and accurate. A wide range of flow rates can be achieved by employing on/off valves having different flow rates.

According to a fourth aspect of the present invention there is provided an ablutionary installation comprising a mixing valve having respective inlets for hot and cold water and an outlet for temperature controlled water, a temperature sensor for monitoring the outlet water temperature and providing a signal representative of the outlet water temperature to an electronic controller, a user interface permitting selection of outlet water temperature up to a pre-determined temperature, the electronic controller being operable to compare the selected and sensed outlet water temperatures for controlling the mixing valve to adjust the ratio of hot and cold water delivered to the outlet according to the selected outlet water temperature, and means for initiating a disinfection cycle to deliver water to the outlet at a temperature higher than the pre-determined temperature.

By permitting user selection of outlet water temperature up to a pre-determined temperature and employing means to initiate a disinfection cycle to discharge water at a temperature above the pre-determined temperature, the pre-determined temperature can be set to the maximum safe outlet water temperature for the installation, for example for showering, bath filling or hand washing, and the user is prevented from selecting a higher temperature. In this way, the risk of the user being scalded is reduced.

According to a fifth aspect of the present invention, there is provided an ablutionary installation comprising a mixing valve having respective inlets for hot and cold water and an outlet for supplying temperature controlled water to a shower outlet according to user selection of the outlet water temperature, and means for controlling water flow to the shower outlet on start-up so that water flow is prevented for an initial period of time and is paused when the outlet water temperature reaches the user selected temperature.

By delaying the flow of water on start-up and pausing the flow when the desired outlet water temperature is reached, a user can step out of the shower before the flow starts, and leave the shower to warm-up and then step into the shower while the flow is paused before re-starting the flow with the valve set to provide outlet water at the desired temperature.

Preferably, the flow can also be paused while showering without altering the temperature setting of the mixing valve, for example to allow the user to apply soap or shampoo, so that, on re-starting the flow, the mixing valve discharges water having the selected temperature.

According to a sixth aspect of the present invention, there is provided a method of disinfecting a water supply system for at least one ablutionary outlet by passing water through the system at an elevated temperature for a time sufficient to kill bacteria in accordance with a disinfection cycle, wherein means is provided for controlling the supply of water at the elevated temperature in response to an operating sequence requiring at least two inputs to initiate the disinfection cycle.

By employing two inputs to initiate the disinfection cycle, accidental discharge of water at the elevated temperature that may cause scalding may be prevented.

According to a seventh aspect of the present invention, there is provided a water supply system having at least one ablutionary outlet, and control means for monitoring use of the outlet and controlling operation of the outlet to flush pipe work leading to the outlet when the outlet has not been used for a pre-determined period.

By monitoring use of the outlet to flush the pipe work, dead legs of stagnant water are regularly removed when the outlet is not in use. As a result, the growth of harmful bacteria that may cause a health hazard can be significantly reduced or eliminated.

Preferably, the pipe work is flushed with water having a pre-set temperature that does not give rise to a risk of scalding if anyone is present in the vicinity of the outlet when it is opened.

According to an eighth aspect of the present invention, there is provided a mixing valve having respective inlets for connection to supplies of hot and cold water, an outlet for temperature controlled water, valve means for controlling the relative proportions of hot and cold water admitted to a mixing chamber, and a flow guide for delivering the hot and cold water from the valve means to the mixing chamber, the flow guide having a plurality of ducts opening to the mixing chamber, the ducts being arranged in first and second sets with the ducts of the first set alternating with the ducts of the second set, and wherein the first set of ducts receive cold water from the valve means and the second set of ducts receive hot water from the valve means.

By admitting the hold and cold water from the valve means to the mixing chamber in sets of ducts that are alternated, the hot and cold water enters the mixing chamber in parallel streams that are interlaced and entrain one another to promote thorough mixing within a short distance. As a result, the mixed water temperature can be sensed close to the point of mixing which reduces transport delays and allows a higher loop gain to be employed producing quick and accurate control of the mixing valve.

The valve means may be a proportioning valve, for example a shuttle valve, for controlling the ratio of hot and cold water delivered to the mixing chamber. Alternatively, the valve means may be separate valves, for example modulating solenoid valves, for controlling the ratio of hot and cold water delivered to the mixing chamber.

According to a ninth aspect of the present invention, there is provided an ablutionary installation comprising a mixing valve having respective inlets for hot and cold water and an outlet for supplying temperature controlled water to a shower outlet according to user selection of the outlet water temperature, and user operable means for controlling operation of the mixing valve, the control means comprising an interface panel for user selection of shower settings wherein one or more shower settings can be selectively blocked.

By selectively blocking one or more shower settings, the shower can be set to prevent users, especially young children or the elderly, selecting settings that may be unsuitable. For example, the shower may be set to control one or more of outlet water temperature, flow rate, flow duration that can be selected by the user. Indeed, the shower may be set so that the valve can be turned on and off to discharge water having a pre-set temperature and flow rate for a pre-set time only with all other functions blocked. In this way, the shower can be set to operate in an inherently safe mode and any change to the settings requires the user to unblock the control means by suitable means, for example by inputting a code to release the control means for adjusting any of the settings.

The invention in each of its aspects will now be described in more detail by way of example only with reference to the accompanying drawings wherein like reference numerals are used throughout to indicate corresponding parts and in which:

DETAILED DESCRIPTION

Figure 1:
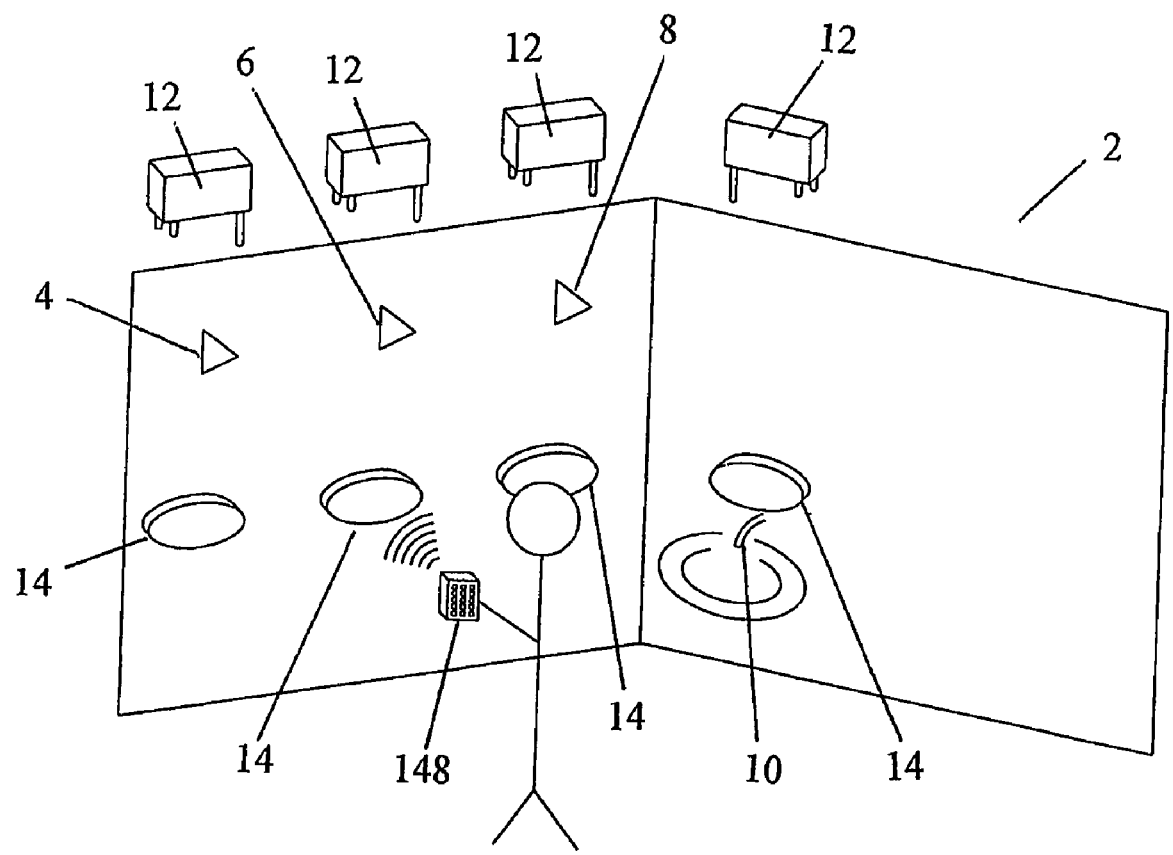
FIG. 1 is a diagrammatic perspective view of an ablutionary installation with multiple outlets for showering and handwashing.

Referring first to FIG. 1, there is shown an ablutionary installation for a healthcare or leisure establishment having a plurality of outlets for discharge of temperature controlled water for washing. In this embodiment, the installation depicts a washroom 2 with three outlets 4,6,8 for showering and one outlet 10 for a handbasin for handwashing.

Each shower outlet 4,6,8 may comprise a single spray head or a combination of spray heads, for example a fixed shower rose, a handset and body jets. The handbasin outlet 10 may comprise a tap spout. It will be understood, however, that this arrangement of outlets is for illustration of the invention only and that the number and type of outlets may be varied according to the requirements for a given installation. For example some installations may be provided with an outlet for a bath.

Each outlet 4,6,8,10 is provided with a respective water supply unit 12 for controlling the supply of the temperature controlled water to the outlet 4,6,8,10 in accordance with user selection via a respective user interface 14 located in the washroom 2 adjacent to the associated outlet 4,6,8,10. The supply units 12 are located outside the washroom and communicate with the associated user interface 14 by any suitable means, for example a hard wire serial link or a wireless link such as a serial digital communication by a short range radio link.

Figure 2:
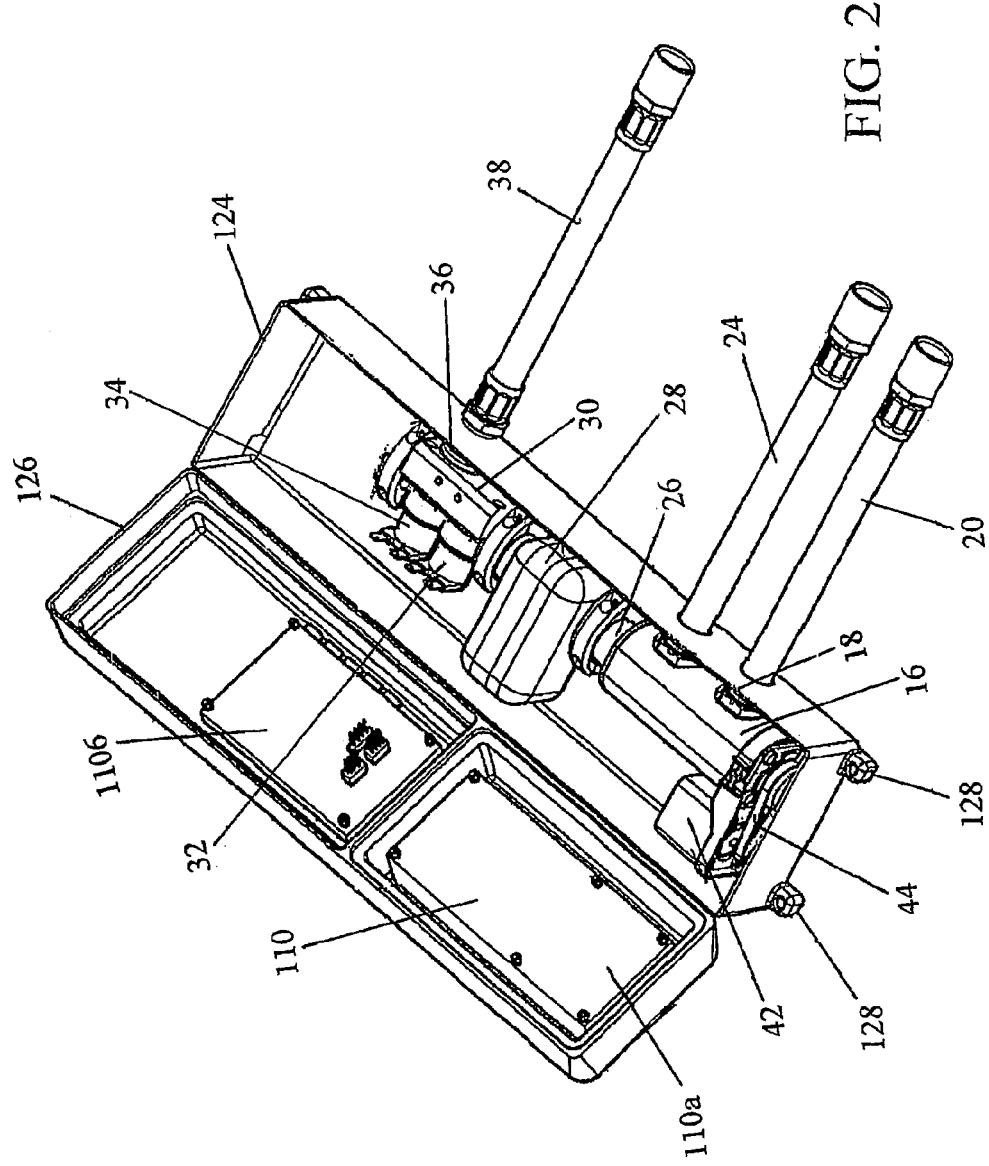
FIG. 2 is a perspective view of a water supply unit with an electronic thermostatic mixing valve for supplying temperature controlled water to an outlet of the installation shown in FIG. 1, the unit being shown with the casing open to show the internal components.
Figure 3:
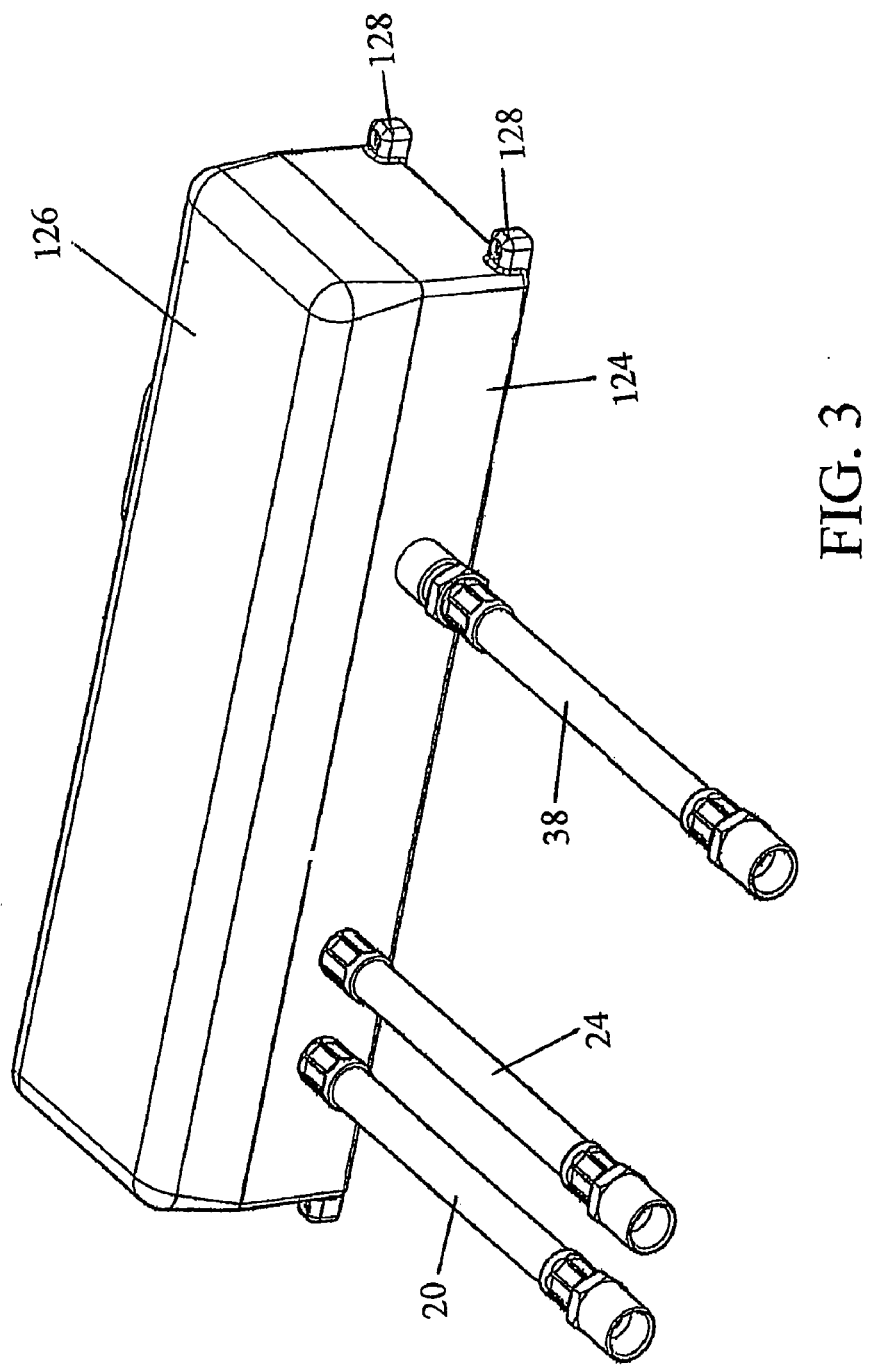
FIG. 3 is a perspective view similar to FIG. 2 with the casing closed.
Figure 4:
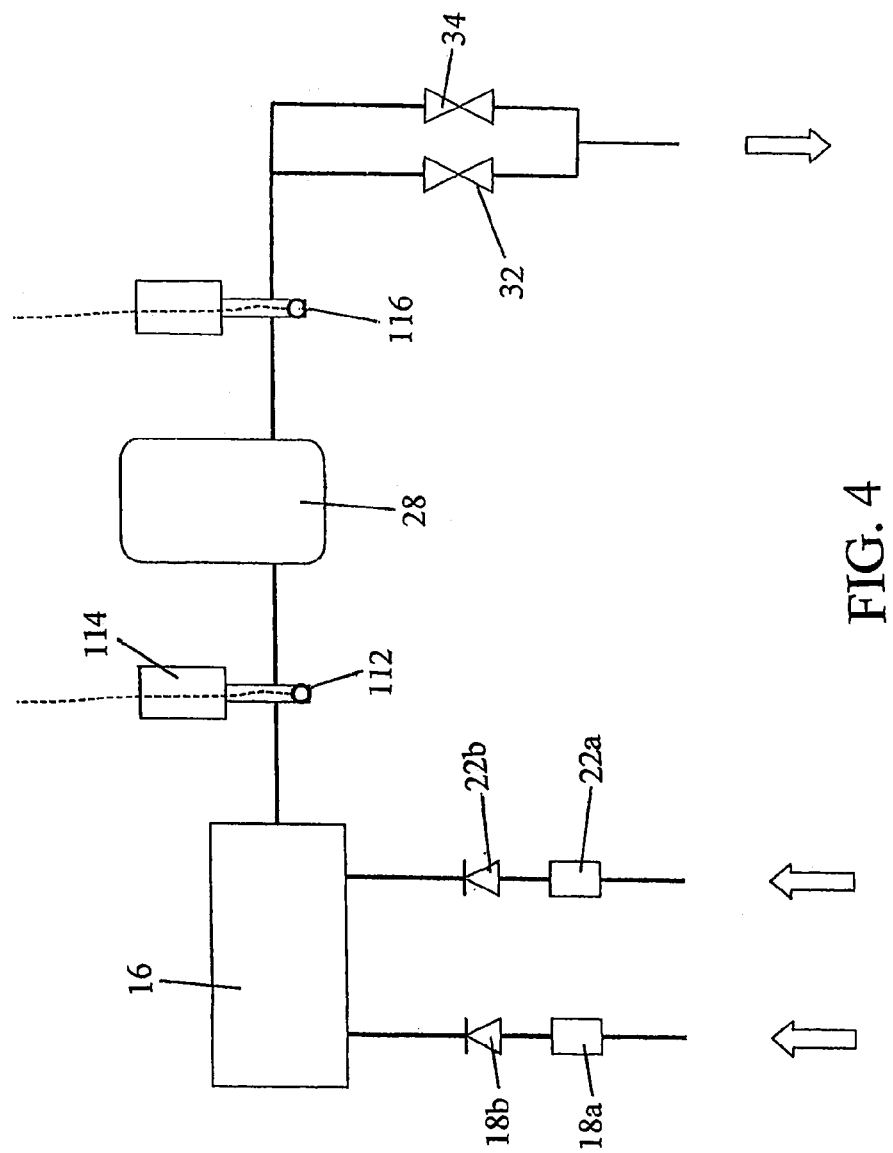
FIG. 4 is a diagrammatic lay-out of the unit shown in FIGS. 2 and 3.

Referring now also to FIGS. 2 to 4, each water supply unit 12 is similar and comprises a mixing valve 16 with an inlet 18 coupled to a hose connector 20 for connection to a supply of cold water, for example mains cold water, an inlet 22 coupled to a hose connector 24 for connection to a supply of hot water, and an outlet 26 coupled to a damping chamber 28. Each inlet 18,22 is provided with a filter 18a,22a and a non-return valve 18b,22b.

The damping chamber 28 is connected to an outlet manifold block 30 having a pair of solenoid valves 32,34 controlling flow to an outlet 36 coupled to a hose connector 38. The solenoid valves 32,34 are arranged to close automatically if the electricity supply fails.

Each solenoid valve 32,34 includes a flow regulator (not shown) set so that one valve provides a higher flow rate than the other valve. The valves 32,34 are arranged in parallel so that selecting the valves in a binary sequence gives a range of flow rates. More specifically, the pair of valves 32,34 can provide three flow rates by having either valve open on its own or both valves open together.

The binary control of flow has the advantage of simplified operation with no motor driver circuits to adjust the flow rate. It will be understood that the number of solenoid valves associated with each outlet and the combination of such valves may be varied as desired to provide any required range of flow rates for a given outlet.

Figure 5:
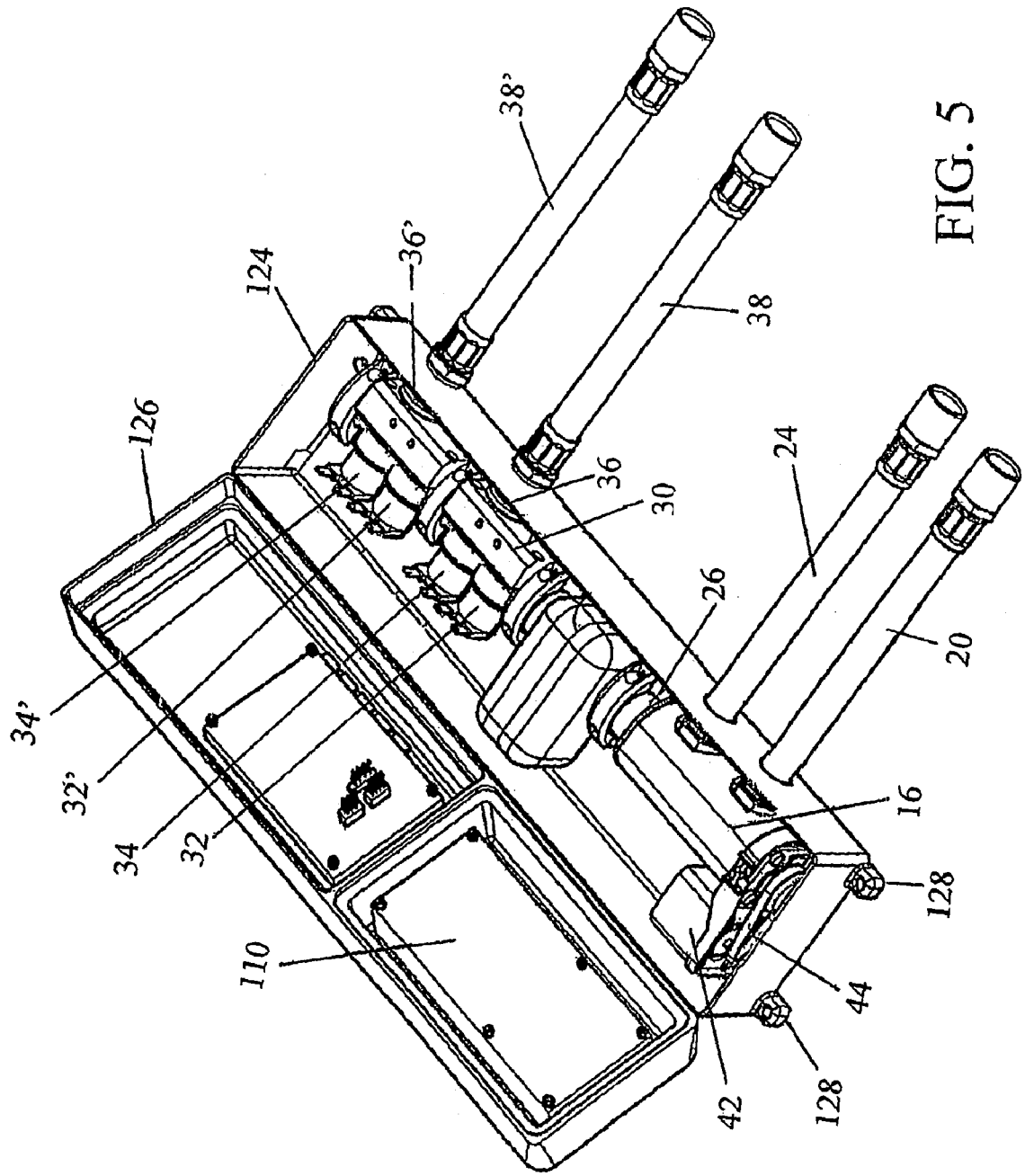
FIG. 5 is a perspective view similar to FIG. 2 showing a modification to the water supply unit.
Figure 6:
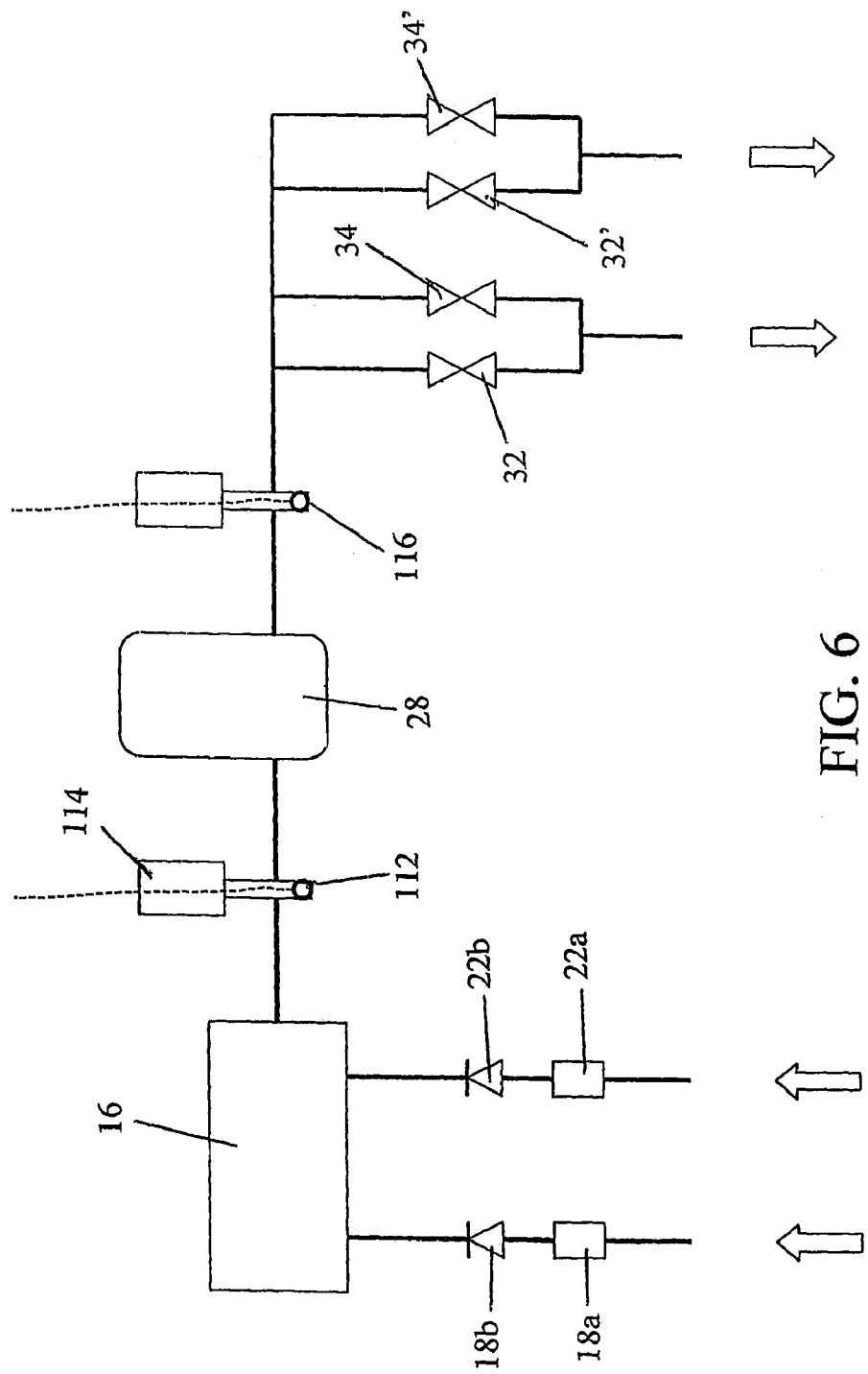
FIG. 6 is a diagrammatic lay-out of the unit shown in FIG. 5.
Figure 7:
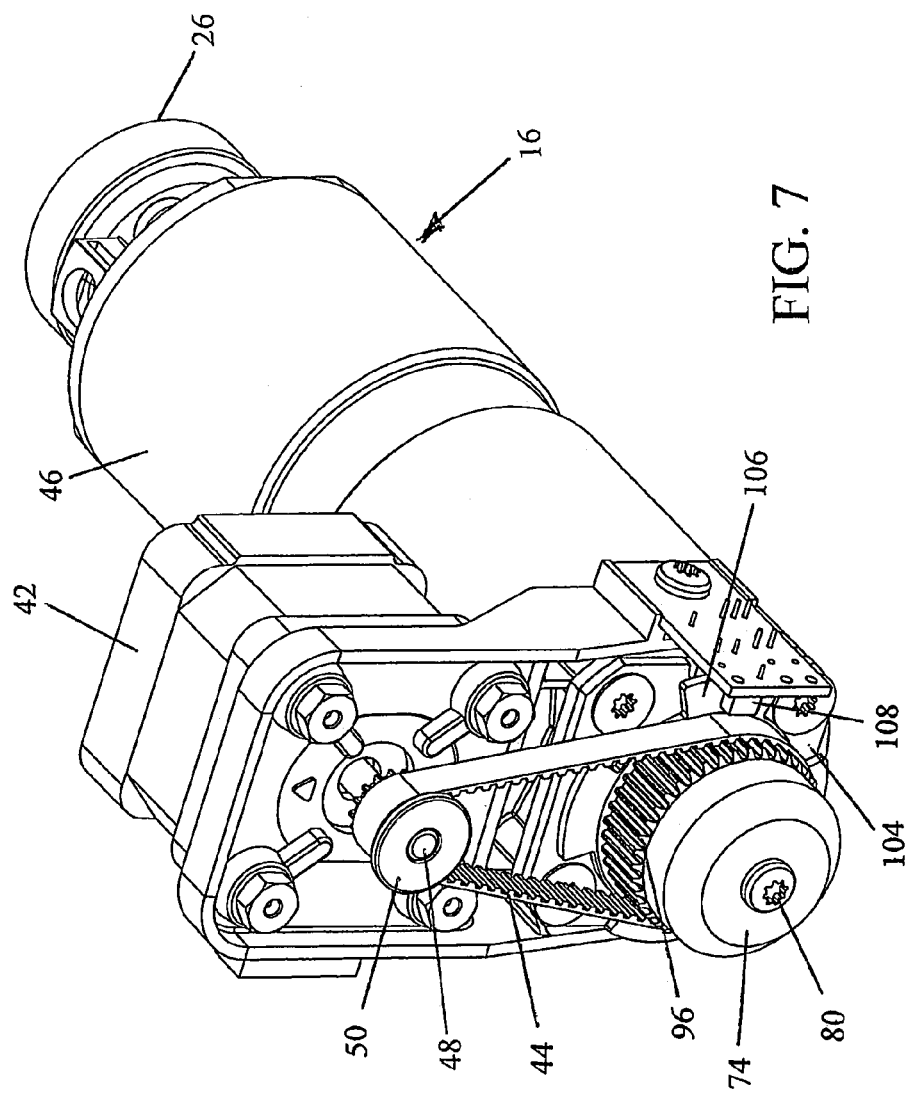
FIG. 7 is a perspective view from above of the mixing valve and stepper motor of the water supply unit shown in FIGS. 2 to 6.
Figure 8:
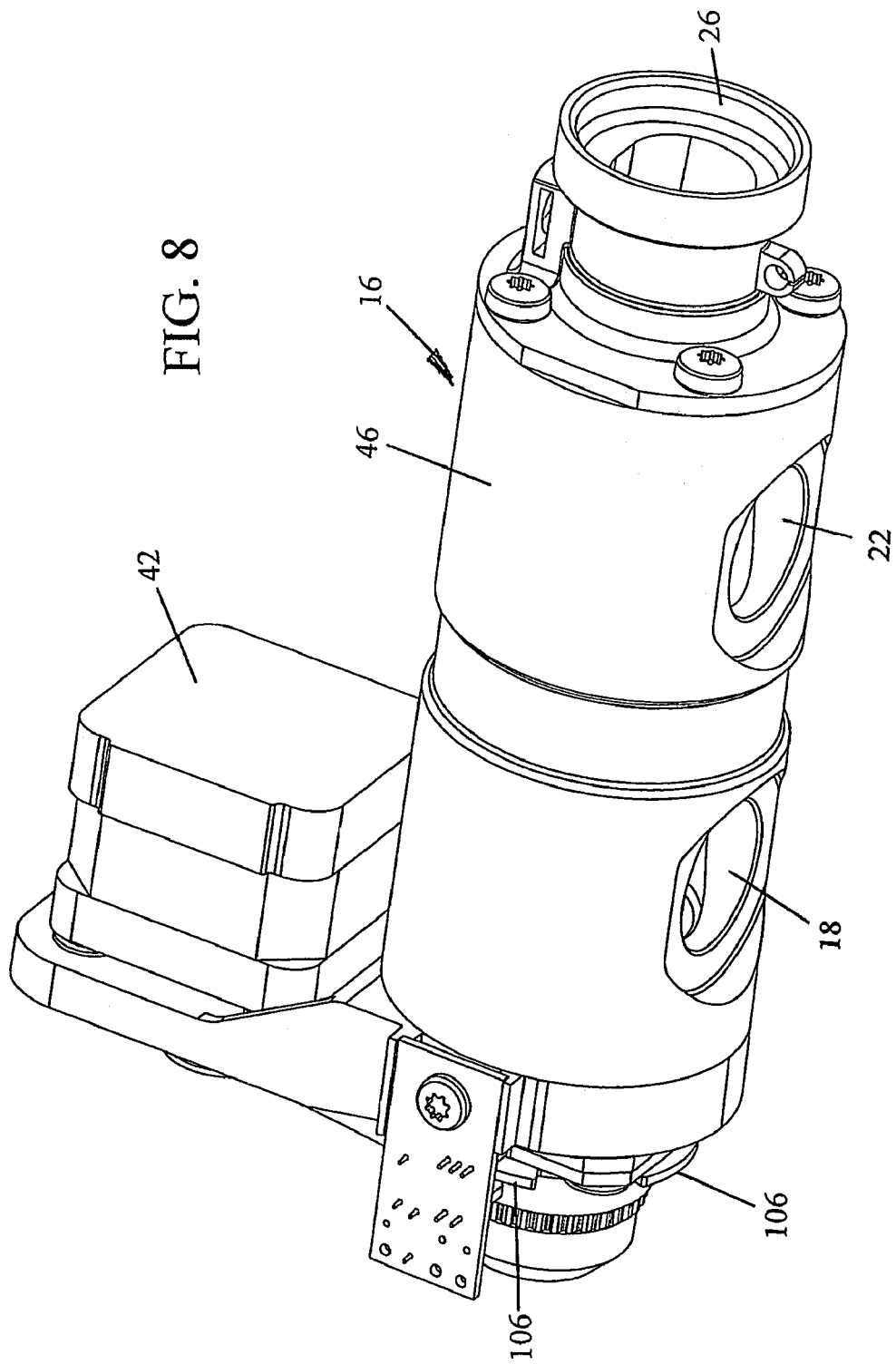
FIG. 8 is a perspective view from below of the mixing valve and stepper motor shown in FIG. 7.
Figure 9:
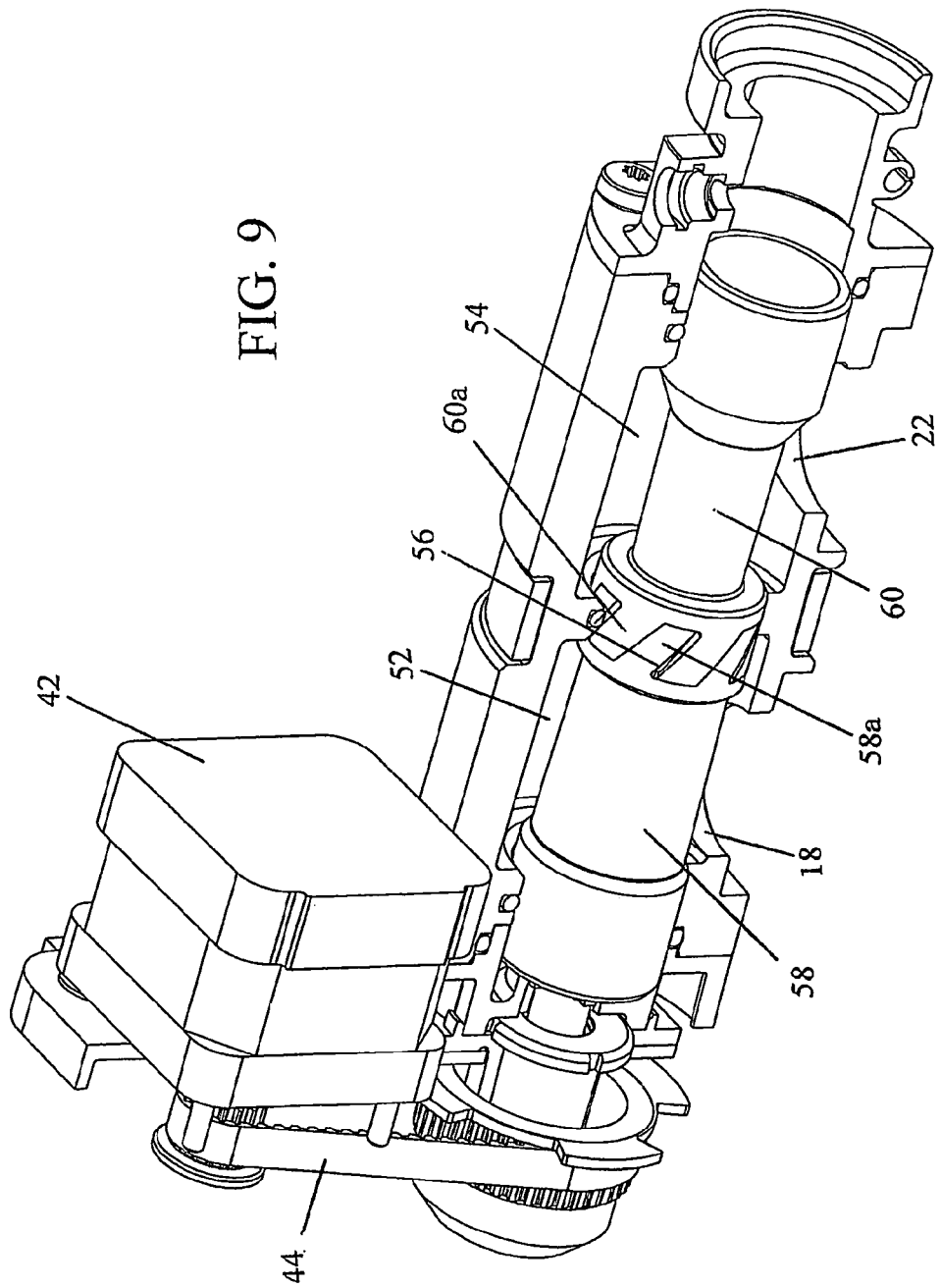
FIG. 9 is a part-sectional view of the mixing valve and stepper motor shown in FIGS. 7 and 8.
Figure 10:
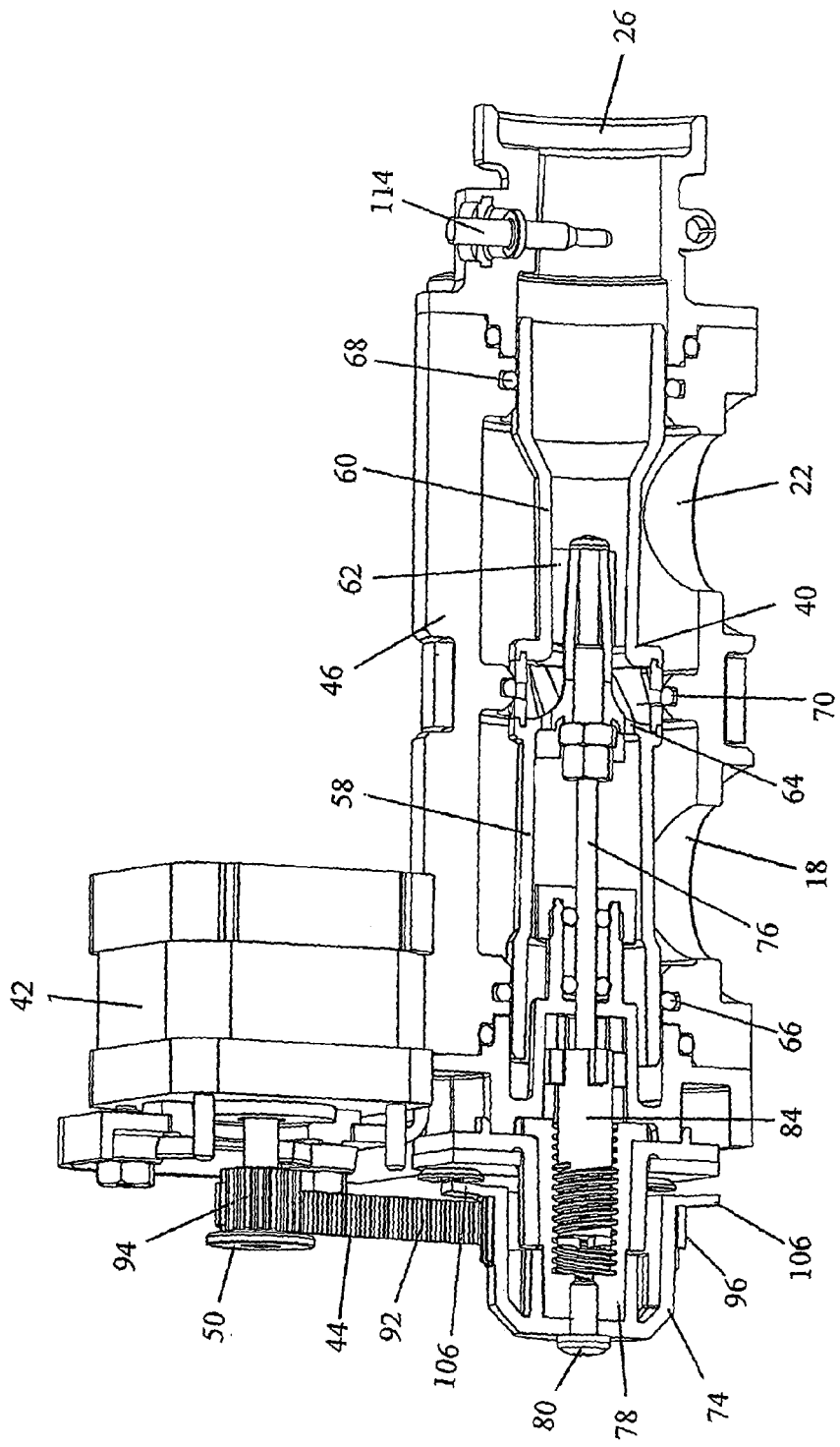
FIG. 10 is a part-sectional view of the proportioning valve mechanism of the mixing valve shown in FIGS. 7 to 9.
Figure 11:
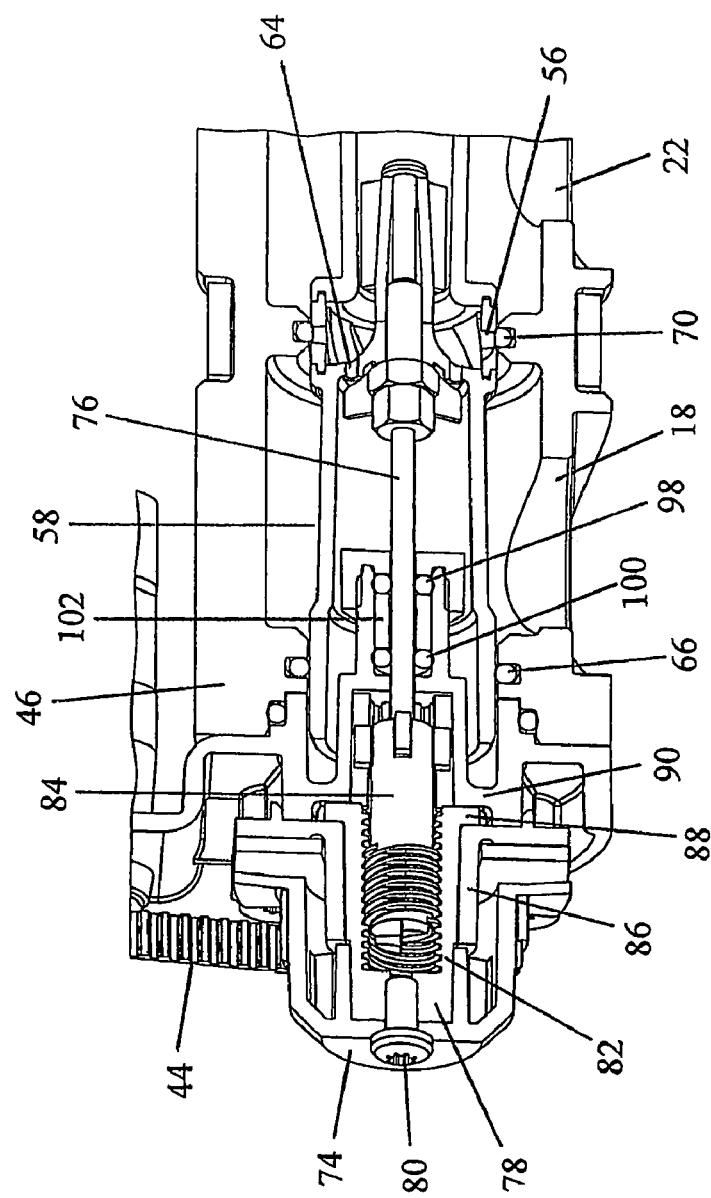
FIG. 11 is a part-sectional view, to an enlarged scale, of the drive mechanism for the mixing valve shown in FIGS. 7 to 10.

In a modification shown in FIGS. 5 and 6, the manifold block 30 has two outlets 36,36' and two pairs of solenoid valves 32,34 and 32',34' for controlling flow to the outlets 36,36' with each pair of solenoid valves 32,34 and 32',34' connected in parallel with differently rated flow regulators providing three flow rates to the associated outlet 36,36'.

The outlets 36,36' may be connected to different outlets in the washroom, for example a shower outlet, a handbasin outlet or a bath outlet. Alternatively, a shower outlet may have multiple outlets such as a fixed rose, a handset and body jets and each of these may be connected to a separate outlet from the manifold block 30. Various combinations of outlets from the water supply unit and the outlets in the washroom may be employed as will be apparent to those skilled in the art.

With reference now also to FIGS. 7 to 11, the mixing valve 16 comprises a spool valve having a valve spool 40 (FIG. 10) axially movable between two end positions corresponding to full hot and full cold under the control of a stepper motor 42 coupled to the valve spool 40 by a drive mechanism including a drive belt 44. The stepper motor 42 is mounted at one end of the valve body 46 and has a drive shaft 48 provided with a drive pulley 50. The water outlet 26 is provided at the other end of the valve body 46 with the inlets 18,22 for cold and hot water between the ends.

The inlets 18,22 open to plenum chambers 52,54 that are relatively large by comparison to slotted ports 56 in the valve spool 40 so that the incoming streams of hot and cold water are well distributed around the ports 56. The valve spool 40 is constructed from two parts, a drive spool 58 and a flow guide spool 60, each with spiral castled extensions 58a,60a that interlock leaving spaces to form the ports 56. In this way, the valve spool components 58,60 can be made as plastic mouldings although it will be understood that any other suitable material can be used.

The mixing valve 16 can be adapted to meet differing flow rate requirements by fitting flow guide spools 60 with castled extensions 60a of different width to the same drive spool 58 so that the ports 56 are of an appropriate size. The median flow version is illustrated and the higher flow rate version has ports that are 50% wider. The lower flow rate version has wider spiral castled extensions that close off alternate ports so the remaining ports are the same size as the ones illustrated and the total flow area is reduced by 50%. An identifier feature is included on the flow guide spools 60 to distinguish between the different versions for assembly.

Each flow guide spool 60 has a mixing passage 62 sized so that the water flow is turbulent and there are small holes 64 linking the mixing passage 62 with the inside of the drive spool 58 to balance the pressures inside the spool assembly to substantially the same as the outlet pressure so that there is no resultant axial force acting on the valve spool 40.

The valve spool 40 is engaged at each end by a respective O-ring seal 66,68 and by a further seal 70 between the ends that separates the hot and cold inlet plenum chambers 52,54. The diameters of the end seals 66,68 and the separator seal 70 on the valve spool 40 are all the same so that inlet water pressures do not create a resultant axial force on the spool assembly.

The separator seal 70 is a modified 'O'-ring and has a flat on the inside diameter that is 80% of the width of the 'O'-ring section. The flat surface enables the seal 70 to slide across the spool ports 56 easily as the valve spool 40 is displaced between the end positions and keeps proportioning movement backlash to a minimum. The profile of the separator seal 70 is also beneficial in optimising the water stream direction entering the mixing passage 62 in the flow guide spool 60. In a modification (not shown), the O-ring seals 66,68,70 may be replaced by lip seals or any other suitable seal.

The drive belt 44 extends around the pulley 50 of the stepper motor 42 and a drive pulley 74 connected to a drive rod 76 for the valve spool 40 by a lead screw mechanism for converting rotation of the drive pulley 74 into axial movement of the valve spool 40 to vary the size of the ports 56 communicating with the plenum chambers 52,54 to adjust the ratio of hot and cold water delivered to the outlet 26. The diameter of the drive rod 76 is made as small as possible so that the resultant pressure force due to the outlet pressure in the valve develops only a small axial force on the spool assembly.

The lead screw mechanism includes a drive nut 78 keyed to the drive pulley 74 by axial splines (not shown) and secured by a screw 80. The drive nut 78 has a threaded bore 82 engaged by a drive lead screw 84 connected to the drive rod 76. The drive nut 78 runs in a drive bearing 86 and has a flanged end 88 that is located between the drive bearing 86 and a drive housing 90. The running clearance for the drive nut 78 is kept as small as possible to reduce backlash in the whole drive mechanism. The drive lead screw 84 is made integral with the drive rod 76 and has splines that engage a mating set of splines in the drive housing 90 to prevent the drive lead screw 84 rotating with the drive nut 78.

The drive rod 76 is metal and the drive lead screw 84 is moulded on to the rod 76 to make the two parts into a single component. The drive ratio from the stepper motor 42 to the valve 16 is chosen to have sufficient steps to achieve satisfactory temperature resolution under all working conditions. Typically this is about 2500 steps between full cold and full hot. The drive belt 44 is sufficiently elastic to absorb small vibrations that allows the motor 42 to operate at higher speeds for rapid response and has teeth 92 that mesh with teeth 94,96 on the drive pulleys 50,74 to provide a positive drive connection that substantially eliminates slippage enabling the position of the valve spool 40 to be accurately determined from the step pulses to the stepper motor 42.

A seal assembly for the drive rod 76 is provided with two 'O'-rings 98,100 arranged in series on either side of a spacer 102. The spacing between the seals 98,100 is chosen so that no part of the drive rod 76 engages both seals 98,100. In this way, if the first seal 98 is damaged by water borne particles that become embedded in the seal 98 and then score the metal rod 76, the second seal 100 is protected from any contamination.

The drive mechanism is provided with a position encoder 104 comprising circumferentially spaced flags 106 on the drive pulley 74 and an optical sensor 108 mounted on the valve body 46 to detect the flags 106 for monitoring rotation of the drive pulley 74. In this embodiment, four flags 106 are provided uniformly spaced apart in the circumferential direction but it will be understood that the number of flags may be varied. The position encoder 104 is used to detect rotation of the drive lead screw 84 in response to drive signals sent to the stepper motor 42. In the event that no lead screw movement is detected, a valve shutdown sequence is initiated as a safety measure to prevent discharge of water.

The stepper motor 42 is controlled by an electronic controller 110 arranged to receive signals from the user interface 14 for selecting outlet water temperature and from a primary temperature sensor 112 mounted in the outlet 26 upstream of the damping chamber 28 in the tip of a probe 114 arranged to locate the sensor 112 in the middle of the water stream at the end of the mixing passage 62 and close to the valve spool 40.

The electronic controller 110 includes a microprocessor with electronic circuits 110a,b for controlling operation of the stepper motor 42 to move the valve spool 40 to adjust the ratio of hot and cold water delivered to the outlet 26 to achieve and maintain the selected outlet water temperature. Where the flow rate is changed, this may also be input to the electronic controller 110 and used to actuate the solenoid valves 32,34.

In this embodiment, a secondary outlet water temperature sensor 116 is located downstream of the damping chamber 28 before the outlet manifold block 30 and inputs a signal representative of the water temperature to the electronic controller 110.

During valve start-up and operation, the electronic controller 110 carries out system checks to ensure that the unit 12 is working properly. In the event that any of these fail the unit 12 closes down to prevent discharge of water. During operation, the outputs of the two sensors 112,116 are compared and have to be compatible otherwise an error signal is generated to close the solenoid valves 32,34 and prevent discharge of water if the difference between the outputs of the sensors 112,116 exceeds a pre-determined value.

By comparing signals from two sensors 112,116 in this way, accurate operation of the primary sensor 112 is assured. Thus, it is unlikely that both sensors 112,116 would fail in the same way at the same time and the cross-check provided by the secondary sensor 116 ensures that a fault in either sensor 112,116 is detected.

An error signal is also generated to close the solenoid valves 32,34 if the outputs from both sensors 112,116 are compatible and the outlet water temperature detected by one or both sensors 112,116 exceeds a pre-determined value to prevent users being scalded if the outlet water temperature becomes dangerously high The damping chamber 28 is positioned between the primary temperature sensor 112 and the secondary temperature sensor 116 and is sized to reduce the size of any temperature overshoots that may occur, for example due to very sudden pressure changes in a high-pressure installation, especially where there is a limit on the maximum permissible overshoot such as in a healthcare establishment.

In this way, the damping chamber 28 ensures that the secondary temperature sensor 116 sees and detects an average outlet water temperature to prevent the solenoid valves 32,34 being closed in response to a transient temperature overshoot exceeding the pre-determined temperature difference between the primary and secondary temperature sensors 112, 116.

Figure 12:
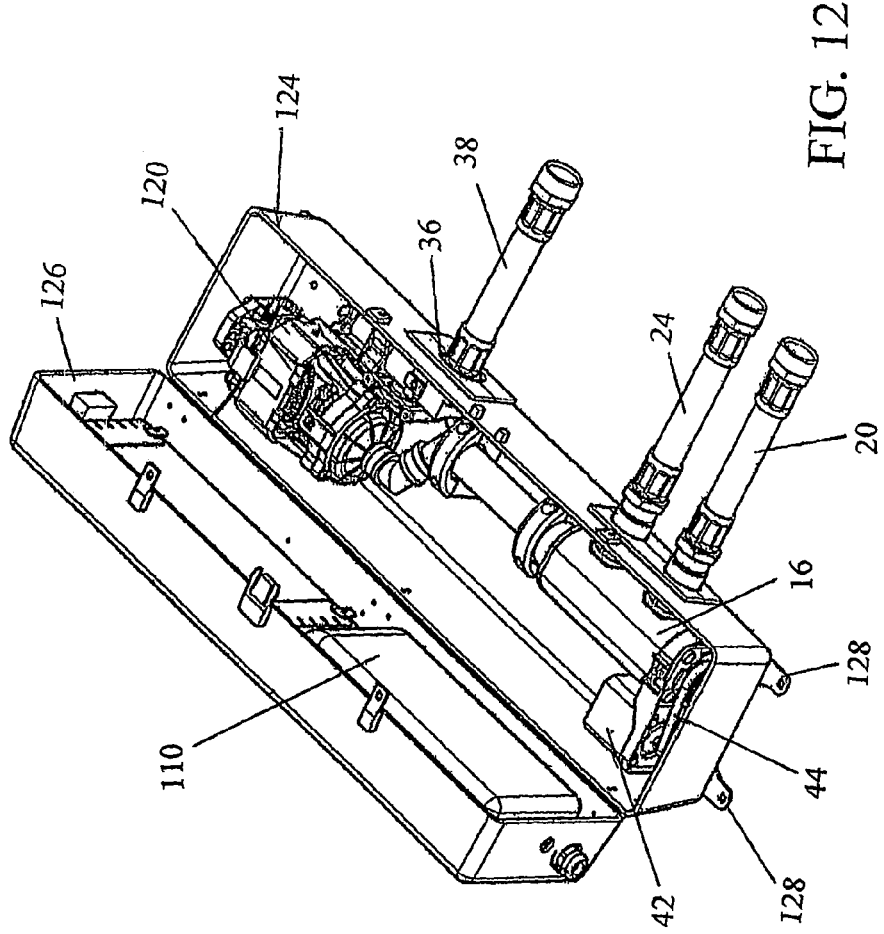
FIG. 12 is a perspective view similar to FIG. 2, showing another modification to the water supply unit.
Figure 13:
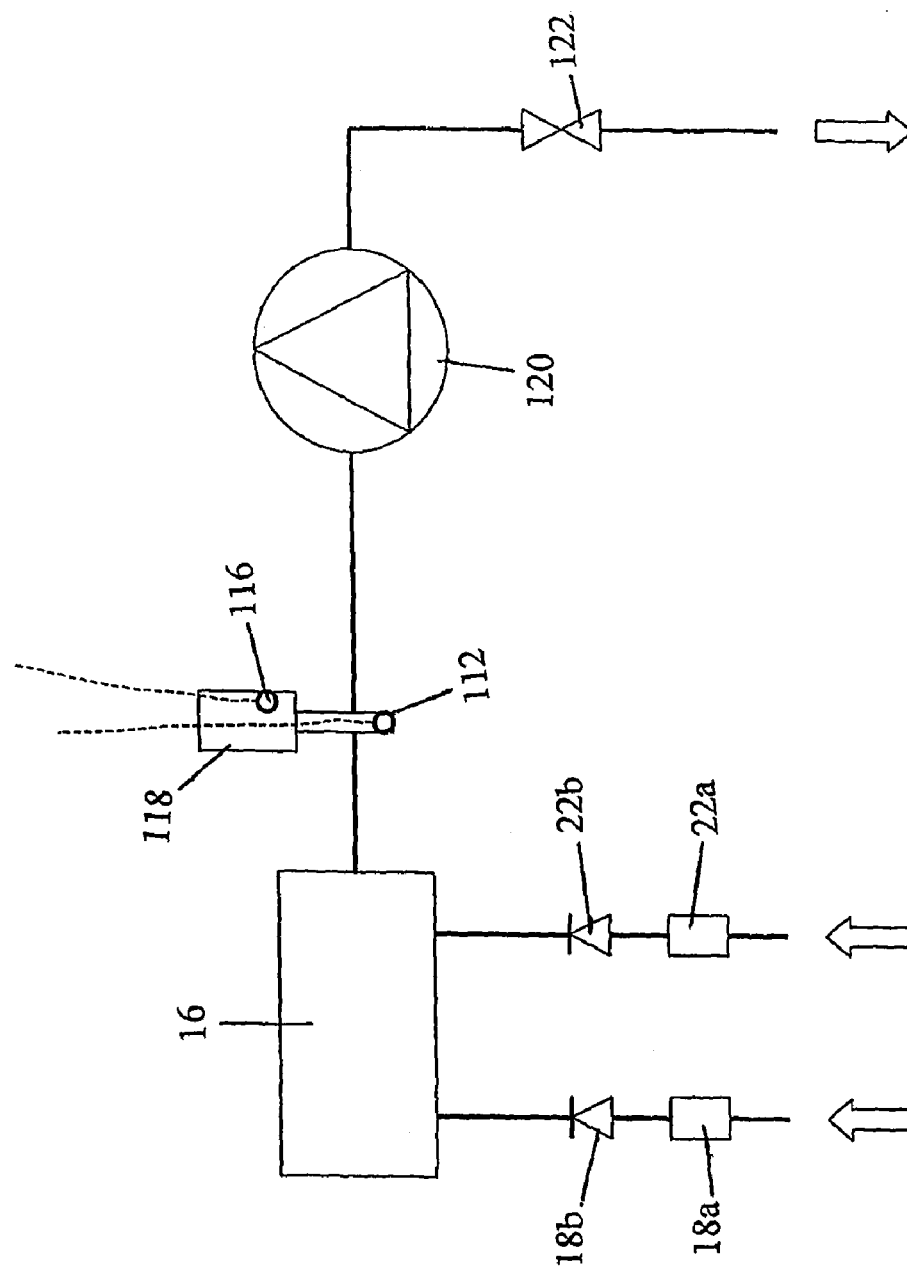
FIG. 13 is a diagrammatic lay-out of the unit shown in FIG. 12.

For some applications, for example low pressure installations, the damping chamber 28 may not be required and FIGS. 12 and 13 show a modification to the water supply unit 12 in which the damping chamber is omitted and the primary and secondary temperature sensors 112,116 are both fitted in a single probe 118 located in the outlet of the mixing valve 16.

As shown, the primary temperature sensor 112 is mounted at the tip of the probe 118 to locate the sensor 112 in the middle of the water stream to retain rapid response and the secondary temperature sensor 116 is in the shank of the probe 118 to locate the sensor 116 at the edge of the water stream where its response is damped.

In this way, the secondary temperature sensor 116 detects an average outlet water temperature and the control system is responsive to the detected water temperatures to actuate the stepper motor 42 to adjust the position of the valve spool 40 to maintain a selected outlet water temperature as described previously.

In this embodiment, a pump 120 is provided downstream of the temperature probe 118 the manifold block 30 has one on-off solenoid valve 122 for controlling flow to the outlet 36 and the pump speed is adjustable to control flow rate. More than one outlet 36 could be provided according to the requirements for a particular installation.

The output from the two temperature sensors 112,116 can also be used to correct for slight errors that may occur in the homogeneous quality of the mixed water at the primary temperature sensor 112. Thus, if mixing is incomplete following a pressure change there will be a sudden offset in the outlet temperature due to the primary temperature sensor 112 picking up the wrong temperature, but the temperature at the secondary temperature sensor 116 will be correct. The electronic controller 110 can use this data to produce a damped control adjustment of the mixing valve 16 to correct for the mixing error.

The mixing valve 16, stepper motor 42, controller 110 and other parts of the unit 12 are housed in a rectangular box having a base 124 and a cover 126 hinged to the base 124 for movement between an open position shown in FIG. 2 and a closed position shown in FIG. 3. Alternatively, the cover 126 may be detachably mounted on the base 124. The base 124 has apertured lugs 128 at the corners for inserting screws (not shown) to secure the unit 12 to a support surface.

In the ablutionary installation shown in FIG. 1, the water supply units 12 are located outside the washroom 2 in a concealed location, for example behind a wall panel, to allow access for servicing/maintenance and to protect the units 12 from damage and/or to prevent unauthorised access to the units 12. The user interface 14 for inputting the desired outlet water temperature and/or flow rate for each water supply unit 12 is arranged within the washroom 2 on the wall adjacent to the outlet 4,6,8,10 for the user to select the water temperature and/or flow rate.

Figure 14:
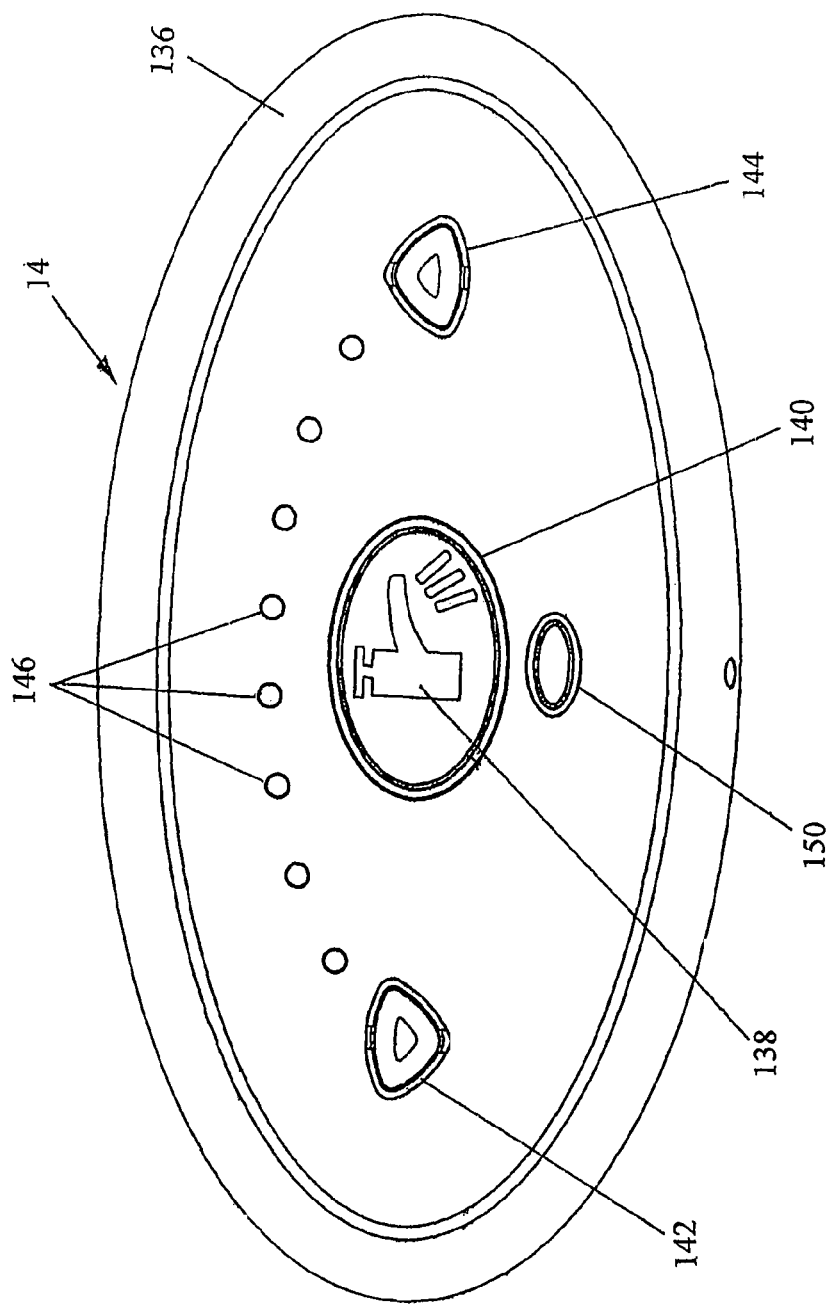
FIG. 14 is a schematic view showing a user interface for the washbasin outlet shown in FIG. 1.
Figure 15:
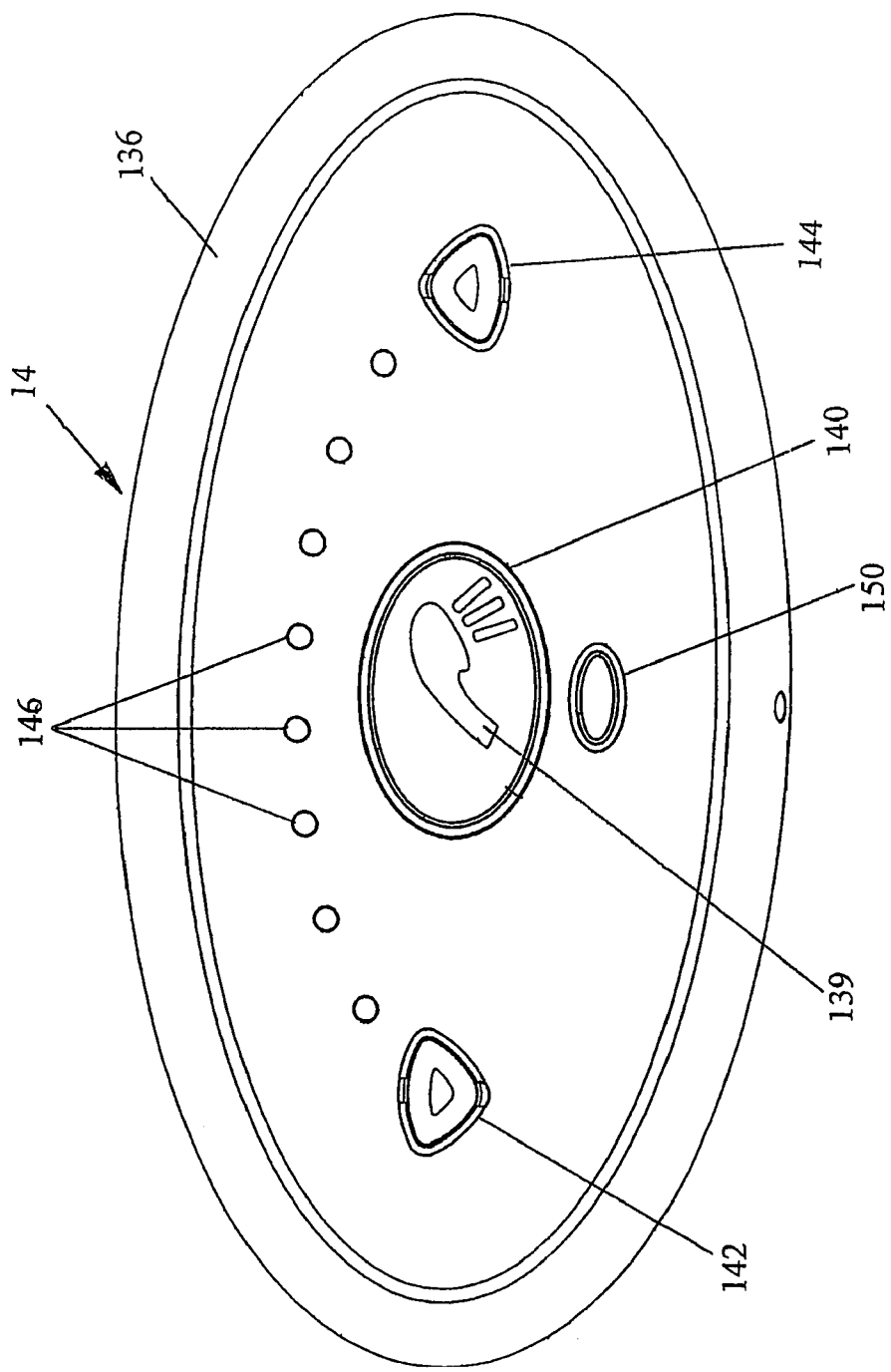
FIG. 15 is a schematic view showing a user interface for the shower outlets shown in FIG. 1.

The user interfaces 14 for the water supply units 12 are generally similar with the interface 14 for the washbasin outlet 10 shown in FIG. 14 and the interface 14 for each of the shower outlets 4,6,8 shown in FIG. 15. The user interface 14 for the washbasin may also be used to control the supply of water to other outlets such as a bath or bidet with appropriate programming of the operation of the valve.

Each interface 14 comprises a wall mounted control panel 136 employing proximity switches with infra-red emitters and detectors for touch-free operation and control of the flow and temperature of the outlet water. The washbasin interface is identified by a tap symbol 138 in a window 140 of the control panel 136 and the shower interface is identified by a shower spray head symbol 139 in the window 140.

Window 140 is an on/off control window and windows 142, 144 are outlet water temperature control windows. Control window 142 decreases the temperature and control window 144 increases the temperature. The windows 142,144 are generally symbolic of up and down arrows to provide a visual indication of the function to the user. Between the windows 142,144 is a series of indicator lights 146 that go on or off in sequence to indicate the outlet water temperature.

Operation of the washbasin interface will now be described and it will be understood that this also applies to the operation of each of the shower interfaces. With the valve off, the on/off window 140 with the tap symbol 138 is illuminated to indicate to a user that this is the window 140 to use to start the water flow. A user holds their hand near to the infra-red window 140 without having to touch it. The valve starts at a default warm temperature.

When the flow starts, the window 142 is illuminated blue and the window 144 is illuminated red. The outlet water temperature is shown by illumination of the corresponding indicator lights 146 up to and including the water temperature. The light 146 nearest the window 142 is illuminated blue and the light nearest the window 144 is illuminated red. The remaining lights 146 are illuminated amber.

By using the temperature up and down control windows 142,144, the outlet water temperature can be adjusted to the users choice. When the temperature is changed, the light corresponding to the selected temperature flashes until the temperature of the outlet water reaches the selected temperature. Each light 146 comes on and off at two levels of intensity so the number of temperature levels that can be indicated is double the number of lights.

The control panel 136 contains a circuit board (not shown) with a non-volatile memory to generate a "time-out" signal to close the solenoid valves 32,34 a pre-determined period of time after the valves are opened. The control panel 136 is supplied with a factory set default "time-out" signal that can be re-set in use by means of a palm top programmer/computer 148 (see FIG. 1) arranged to communicate with the control panel 136 via a window 150 (infra-red serial data port) in the panel 136. Any other means of setting/re-setting the "time-out" signal may be employed.

The control panel 136 is connected to the electronic circuits 110a,b of the controller 110 for the mixing valve 16 of the associated supply unit 12 by any suitable means such as a hard wired serial link or serial digital communication by a short range radio link. The electronic circuits 110a,b include non-volatile memory that is used to store data relating to the valve manufacture, use history and service history. Stored data can be retrieved using the palm top programmer/computer 148 (see FIG. 1) which communicates with the controller 110 via the window 150 (infra-red serial data port) in the control panel 136.

Each supply unit 12 is supplied with factory settings, for example maximum outlet water temperature, flow times etc, for the intended application, for example for a washbasin or shower, but it will be possible for a service engineer to alter the configuration via the window 150 according to the requirements for a particular installation.

Each supply unit 12 is also programmed to carry out a duty flush cycle which is an automatic operation of the unit 12 for a short period of time to draw-off stagnant water in the pipe-work to any outlets 4,6,8,10 that have not been used for a pre-set time period. In this way, stagnant water in which bacteria can grow is periodically flushed from the pipe-work during periods of non-use. The duty flush takes place automatically at normal ablutionary water temperatures and therefore does not present any risk of scalding to anyone who might happen to be present when the duty flush occurs. The duty flush may be programmed to take place following any desired time period of non-use and is generally factory set for the particular application of the supply unit but may be altered by a service engineer during installation or subsequently by means of the palm top programmer/computer 148.

The palm top programmer 148 is also used to initiate a manual disinfection cycle designed to kill any bacteria such as "legionella" present in the pipe-work. The manual disinfection routine using the palm-top programmer 148 is now described in more detail with reference to the ablutionary installation shown in FIG. 1.

1. A responsible person checks the washroom is clear and then uses the palm-top programmer to input a first "arm" signal via the infra-red serial data port of the control panel for one of the outlets to the mixing valve of the associated water supply unit.
2. The programmer then asks the responsible person to confirm that valve must be disinfected and, on confirmation, the programmer sends a second "trigger" signal to the mixing valve. This signal must be received within a pre-determined time, for example 30 seconds, of the first "arm" signal or the disinfection mode will abort.
3. The programmer sends the current time & date to be stored in the controller memory and shows a confirmation message immediately it has determined that the valve has entered disinfection mode.
4. The valve spool moves to the full hot position and the solenoid valves are opened to start the water flow for the disinfection cycle after a pre-set delay, for example 10 seconds (or longer if more than one outlet is to be set-up for disinfection), to allow the person to move to a safe location.
5. The outlet water temperature is monitored through the disinfection cycle and the solenoid valves are closed to switch the water flow off when disinfection has been completed or aborted. During the disinfection cycle, the temperature is recorded at pre-determined intervals, for example every 30 seconds, and logged in the mixing valve memory. The length of time for which the valve must be disinfected is determined by the temperature of the water and is given in the table below:

| Temperature | Disinfection Duration |
|---|---|
| 60° C. | 20 mins |
| 65° C. | 10 mins |
| 70° C. | 5 mins |

Figure 16:
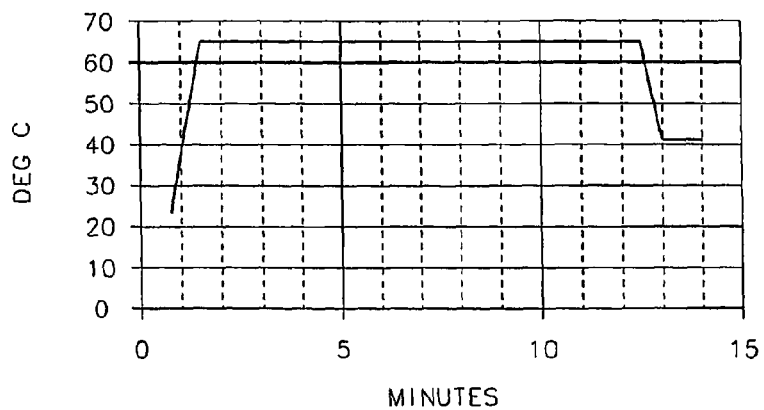
FIG. 16 is a graph depicting a disinfection cycle for the installation of FIG. 1.

As a precaution, the disinfection is provided for slightly longer times than specified above, for example by 1 minute, to ensure that the valve and outlets are fully disinfected.
6. If the outlet water temperature doesn't stay hot enough for long enough to disinfect the valve and pipe-work fully, an "alarm" signal is generated and logged to say "disinfection incomplete due to water temperature too low".
7. If the disinfection is not completed within 30 minutes, the disinfection is aborted and an "alarm" signal is generated and logged to say, "disinfection aborted as it took too long".
8. At any time during the disinfection cycle the user can send a message via the programmer to abort the disinfection. If this occurs an "alarm" signal is generated and logged to say "disinfection aborted by user"
9. After disinfection, the outlet is flushed through with a default (safe) temperature for a pre-determined time, for example 1 minute, to prevent water at the elevated temperature for disinfection remaining in the pipe-work and giving rise to a risk of scalding.
10. On completion of the disinfection cycle, the responsible person downloads the disinfection log from the mixing valve memory to the programmer. The programmer can provide a visual display of the disinfection cycle and/or the disinfection log can be stored to a file in the programmer together with the valve serial number and a unique identifier for the valve. If a disinfection alarm signal has been logged this is automatically displayed when the programmer is connected. A typical display of a disinfection cycle using water at 65° C. is shown in FIG. 16 from which it can be seen that the water temperature was maintained for 11 minutes to complete a satisfactory disinfection cycle.

As will be appreciated, by employing two signals to "arm" and "trigger" the disinfection cycle and by providing a time delay before hot water is discharged from the outlet, the risk of scalding by inadvertent initiation of the disinfection cycle is substantially reduced. Also, by flushing the valve and pipe-work through with cooler water at the end of the disinfection cycle, the risk of scalding is further reduced.

Figure 17:
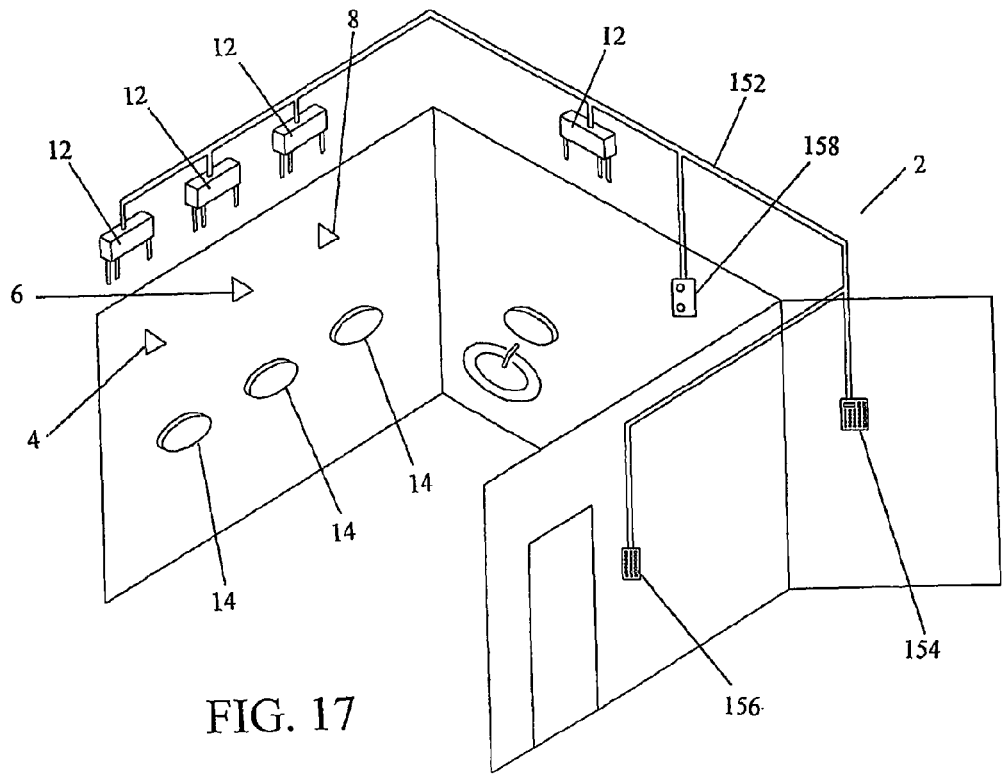
FIG. 17 is a diagrammatic perspective view similar to FIG. 1 showing the network connections for operating the disinfection routine.
Figure 18:
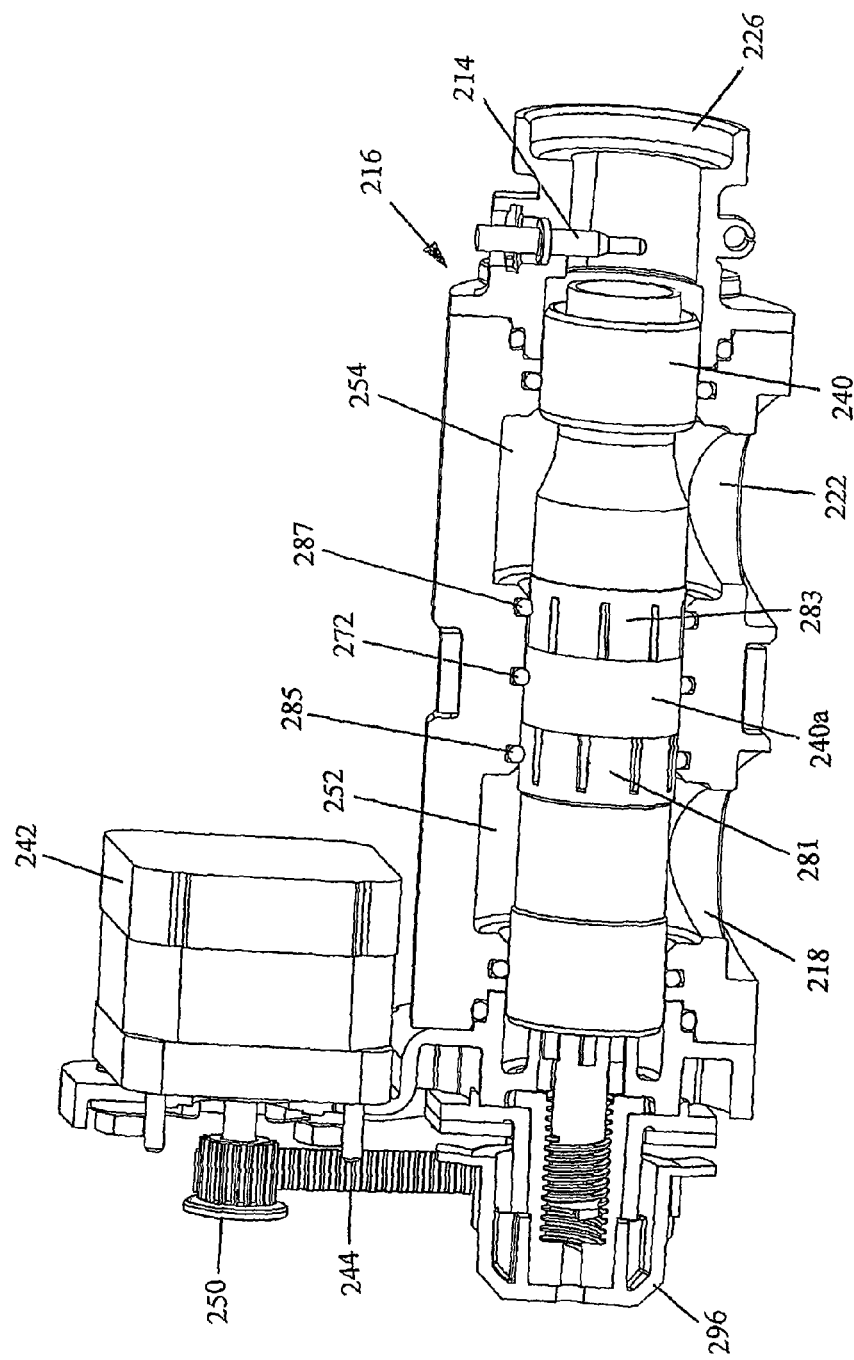
FIG. 18 is a perspective view, partly in section, of a stepper motor and mixer valve with an alternative proportioning valve mechanism for the ablutionary installation of FIGS. 1 to 17.
Figure 19:
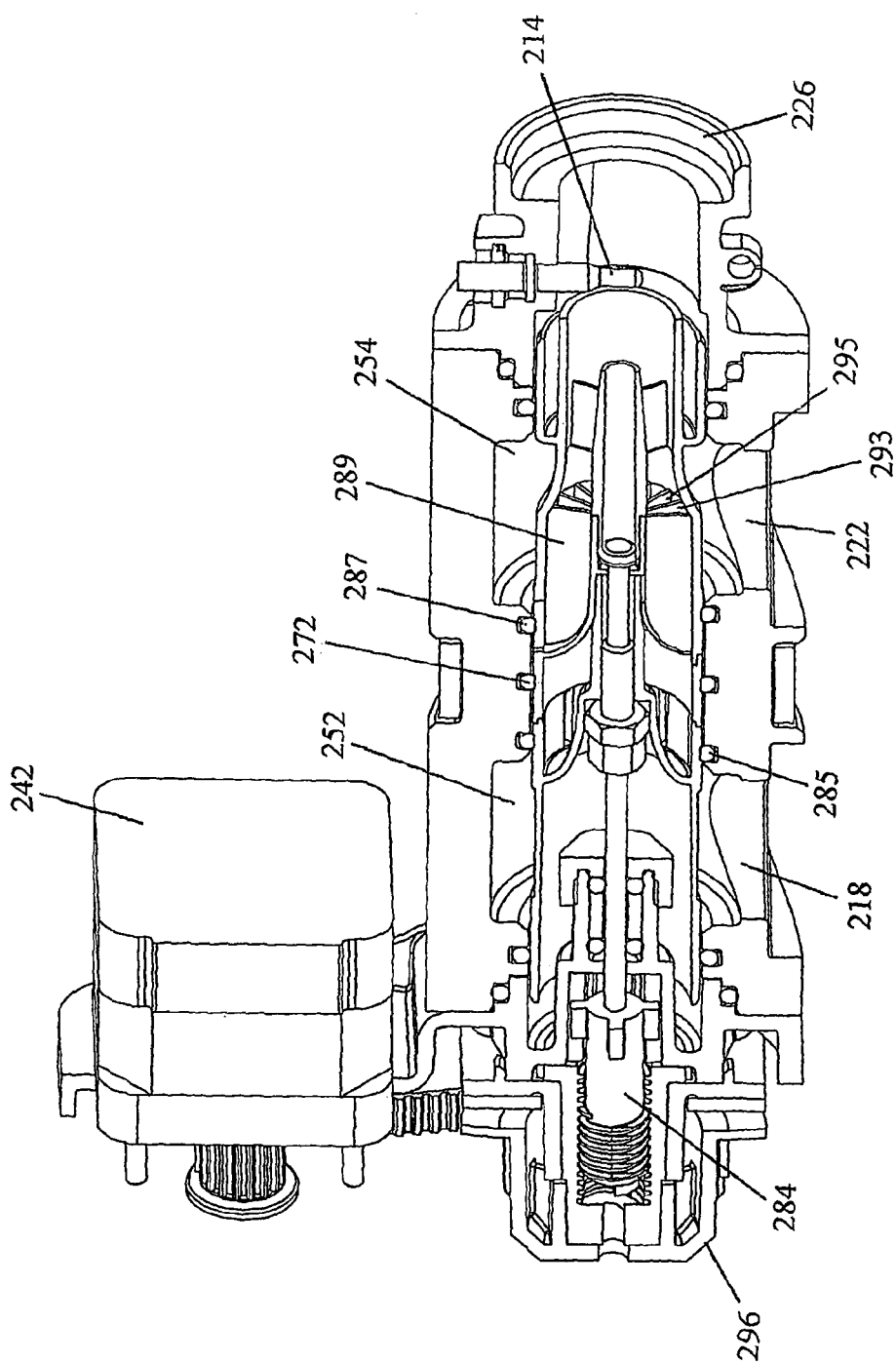
FIG. 19 is a perspective sectional view of the mixer valve shown in FIG. 18.

The above-described manual operation of the disinfection cycle can be adapted for automatic operation of the disinfection cycle in an installation having one or more outlets as shown in FIG. 17. In this installation, the outlets are connected via a network 152 to a scheduler 154 programmed to carry out the disinfection periodically as deemed necessary (e.g. weekly or monthly).

The disinfection cycle would normally be programmed on the scheduler 154 to take place when the building is not occupied but still requires arming and triggering of the disinfection cycle. The "arm" step of the disinfection process is again carried out manually by a responsible person entering a code using a keypad 156 after checking the washroom to ensure that no-one is present. The scheduler 154 then triggers the disinfection cycle as pre-programmed.

The sequence of the cycle is substantially the same as for the manually triggered cycle, but the sequence is disabled if an occupancy sensor 158 detects someone in the room. The keypad 156 can be used to lock the room and prevent entry during the disinfection cycle and/or to stop the disinfection cycle if someone unlocks the room before the disinfection cycle is complete. The disinfection cycle is recorded as before and the record can be viewed locally on the scheduler 154 or retrieved to a palm top programmer/computer via a window (infra-red serial data port) in the scheduler 154.

Remote programming of the operation and/or remote monitoring of the use and service history of each valve may be possible via the network so that a service engineer need only visit when a fault is detected and/or when the installation is to be modified, for example to change the number of outlets and/or the type of outlets.

As will be appreciated, the programmed operation options and data monitoring add considerably to the safe use of mixing valves in leisure and health care establishments and enable the use and service history of the valves to be interrogated if required, for example if a person has been scalded or if an outbreak of legionaire's disease has occurred.

Referring now to FIGS. 18 to 22, there is shown a modification to the mixing valve of FIGS. 7 to 11. For convenience, like reference numerals in the series 200 are used to indicate corresponding parts.

In this modified version of the mixing valve 216, the valve spool 240 has a first set of circumferentially spaced axial slots 281 that communicate with the cold water inlet plenum chamber 252 and a second set of circumferentially spaced axial slots 283 that communicate with the hot water inlet plenum chamber 254. The slots 281,283 are provided in axially spaced sections 240b,c of the spool 240 separated by a centre section 240a. The three sections 240a,b,c may be plastic mouldings secured together by any suitable means.

The valve spool 240 is axially adjustable under the control of the stepper motor 242 as described previously in connection with FIGS. 7 to 11. The centre section 240a is engaged by the separator seal 272 with the slots 281 co-operating with an O-ring seal 285 on one side of the separator seal 272 and the slots 283 co-operating with an O-ring seal 287 on the other side of the separator seal 272. The seals 285,287 control the area of the slots 281,283 communicating with the respective inlet plenum chambers 252,254 in accordance with the axial position of the valve spool 240 and hence the relative proportions of hot and cold water delivered to the outlet 226.

Figure 20:
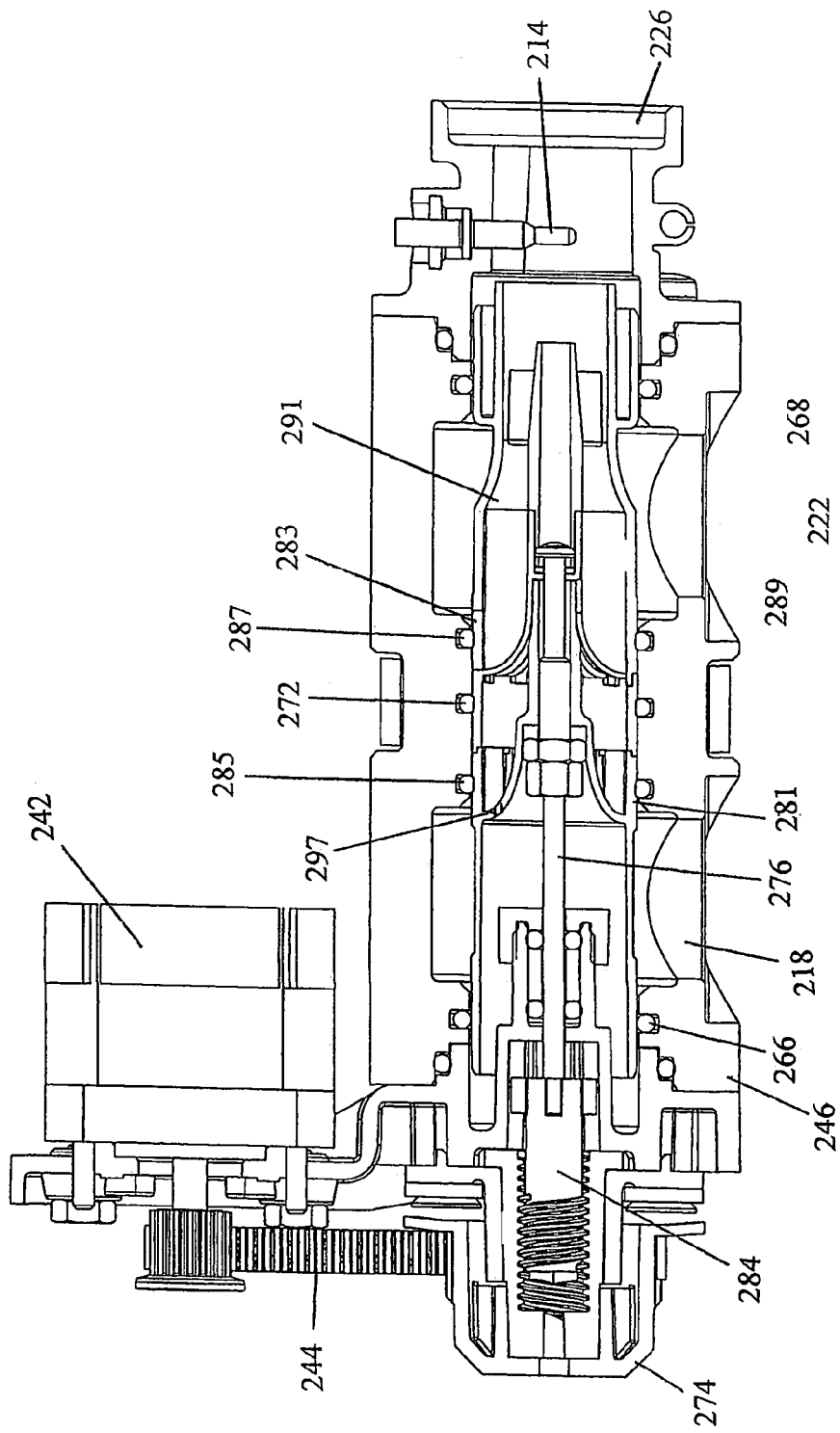
FIG. 20 is a longitudinal sectional view of the mixer valve shown in FIGS. 18 and 19.
Figure 21:
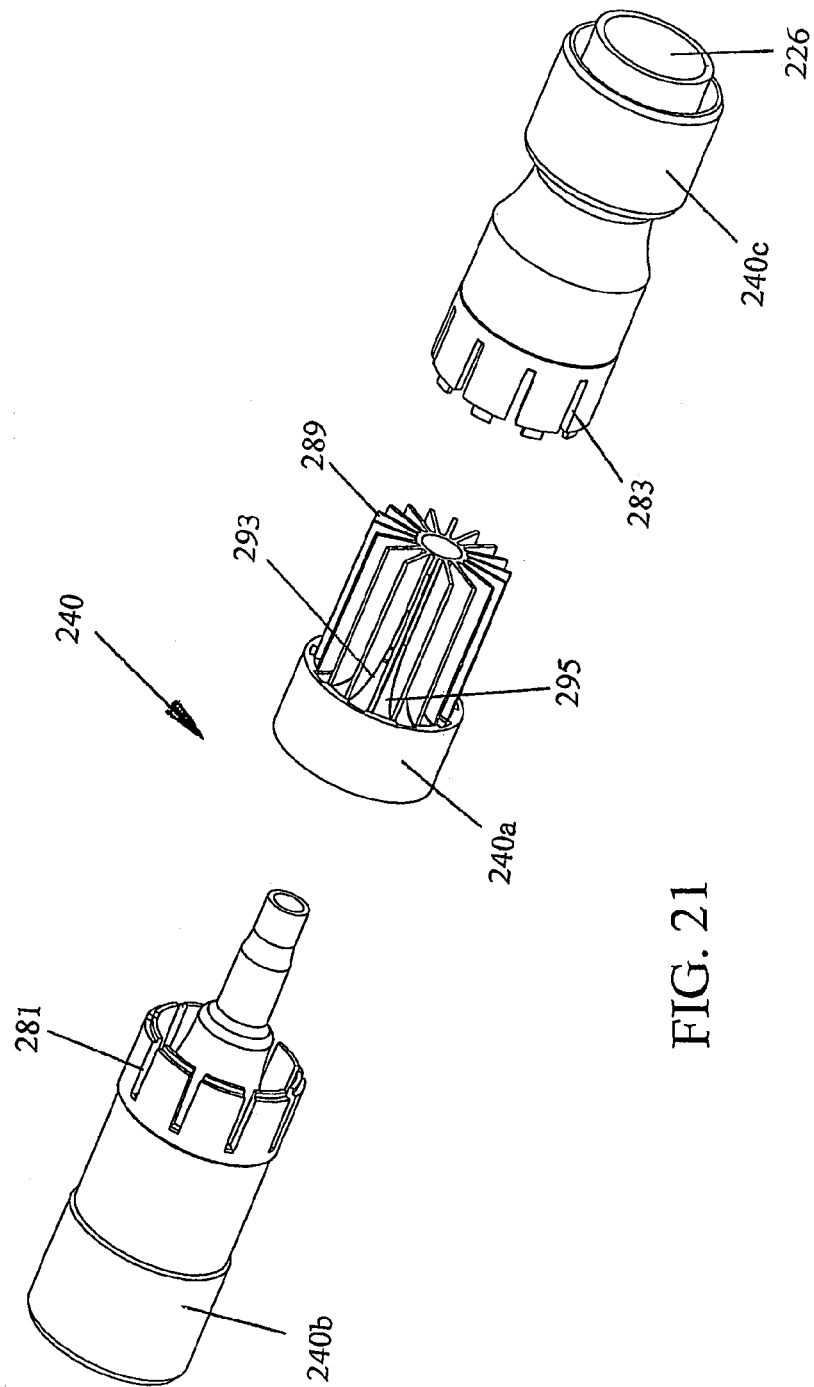
FIG. 21 is an exploded perspective view from one end of the valve spool and flow guide of the mixer valve shown in FIGS. 18 to 20.
Figure 22:
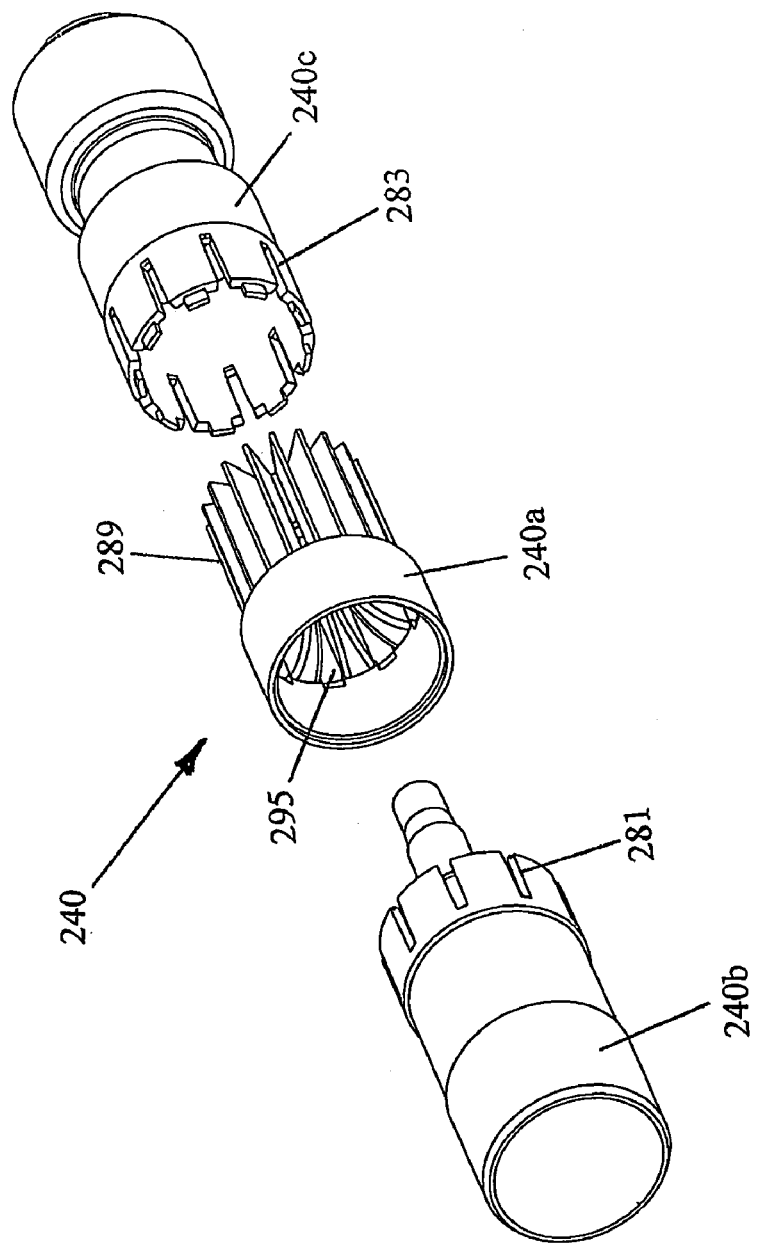
FIG. 22 is an exploded perspective view from the other end of the valve spool and flow guide of the mixer valve shown in FIGS. 18 to 20.

More specifically, displacement of the valve spool 240 to the right as viewed in FIG. 20 increases the area of the slots 283 controlling the flow of hot water and reduces the area of the slots 281 controlling the flow of cold water and movement of the valve spool to the left as viewed in FIG. 20 reduces the area of the slots 283 controlling the flow of hot water and increases the area of the slots 281 controlling the flow of cold water.

The centre section 240a of the valve spool 240 includes a flow guide 289 for bringing the cold and hot water flowing through the slots 281,283 together in an annular mixing chamber 291 upstream of the outlet 226. The flow guide 289 comprises an annular member formed with a plurality of circumferentially spaced axial flow ducts or passages arranged in two sets 293,295 with the ducts of each set alternating with the ducts of the other set in a circumferential direction.

One set of ducts 293 delivers hot water passing through the slots 283 to the mixing chamber 291 and the other set of ducts 295 delivers cold water passing through the slots 281 to the mixing chamber 291. In this way, the water emerges from the ducts 293,295 into the mixing chamber 291 in a plurality of parallel streams of hot and cold water that alternate with each other in the circumferential direction and flow in an axial direction from one end of the mixing chamber 291 to the other end where they flow past the temperature probe 214 before exiting from the valve spool 240 via the outlet 226. The ducts 293,295 may be of any size or shape to produce any desired flow characteristics. The spool 240 is pressure balanced by the provision of a bleed hole 297 allowing the rear end section of the spool 240 to fill with cold water.

The mixing chamber 291 is sized to achieve turbulent flow of the streams, which entrain one another and produce a homogenous mix within a short distance from the point of entry to the mixing chamber 291. In particular, both the hot and cold water streams have the same degree of contact with the inner and outer diameter of the mixing chamber 291 so that the boundary layers at the inner and outer diameters are not biased to hot or cold.

In this way, an accurate value of the mixed water temperature can be obtained when the temperature probe 214 is positioned close to the point of mixing so that transport delays are significantly reduced. As a result, the control system can employ a higher loop gain which, combined with the fast measurement of the mixed water temperature enables the mixing valve to respond to changes in the external water system, for example inlet water pressures and/or temperature, to achieve and maintain a selected outlet water temperature without the need of sensors in the external water system to detect the changes.

A feature of the above-described mixing chamber 291 compared to existing designs of mixing chamber is that it does not have to be intimately associated with the water regulation ports. Consequently, it can be built into any valve mechanism and the hot water and cold water streams conducted to the mixing chamber 291 in any suitable arrangement of separate flow ducts to provide a plurality of alternating streams of hot and cold water emerging into the mixing chamber 291.

Thus, the mixing chamber could be used with valve mechanisms employing a proportioning control that inversely proportions hot and cold water flow rates, or independent flow control of the hot water and cold water with adjustment of the total flow rate as well as the ratios of hot to cold. Such valve mechanisms are well known and the application of the principles of the mixing chamber 291 thereto will be apparent to those skilled in the art.

Figure 23:
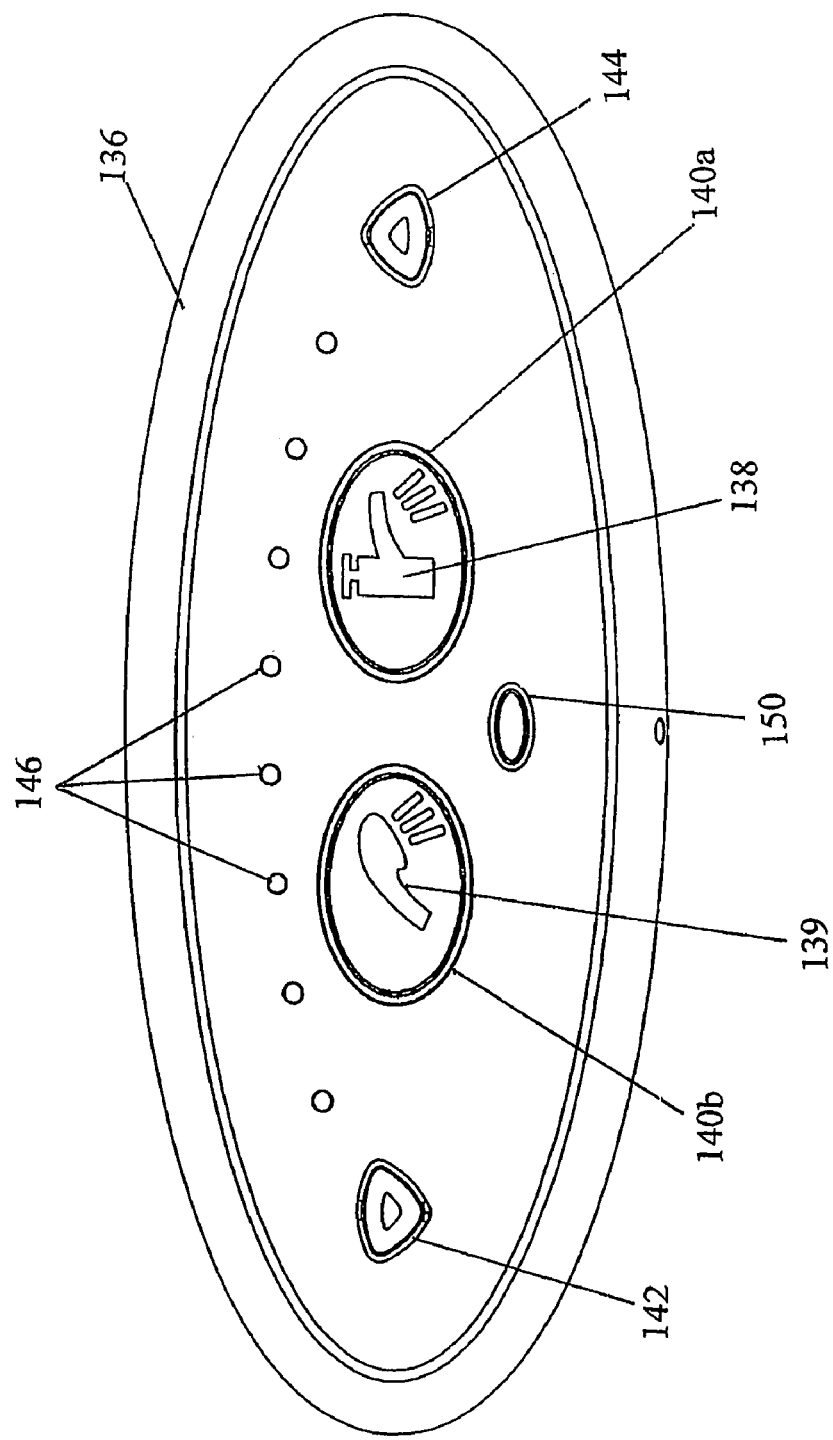
FIG. 23 is a schematic view of an alternative user interface suitable for a shower installation for domestic or hotel use.

Referring now to FIG. 23, there is shown a modification to the interfaces shown in FIGS. 14 and 15 suitable for use in controlling a supply unit for two outlets, for example a bath outlet and a shower outlet, where the maximum outlet water temperature may be different, for example, the shower outlet may have a lower maximum temperature than the bath outlet. For convenience like reference numerals are used to indicate corresponding to the interfaces shown in FIGS. 14 and 15.

In this embodiment, the interface has two on/off windows 140a,140b. One of the windows 140a controls the supply of water to the bath outlet as indicated by the tap symbol 138 in the window 140a and the other window 140b control the supply of water to the shower outlet as indicated by the spray head symbol 139 in the window 140b. In other respects, the operation of this interface is similar to that already given above with reference to FIGS. 14 and 15 and will be understood by those skilled in the art without further description.

Although the invention has been described with particular reference to installations suitable for healthcare and leisure establishments. It will be understood that the invention is not limited to such application and that the invention can be applied to installations in which an electronic control valve is employed to control water supply in the home or a hotel or other establishment.

Figure 24:
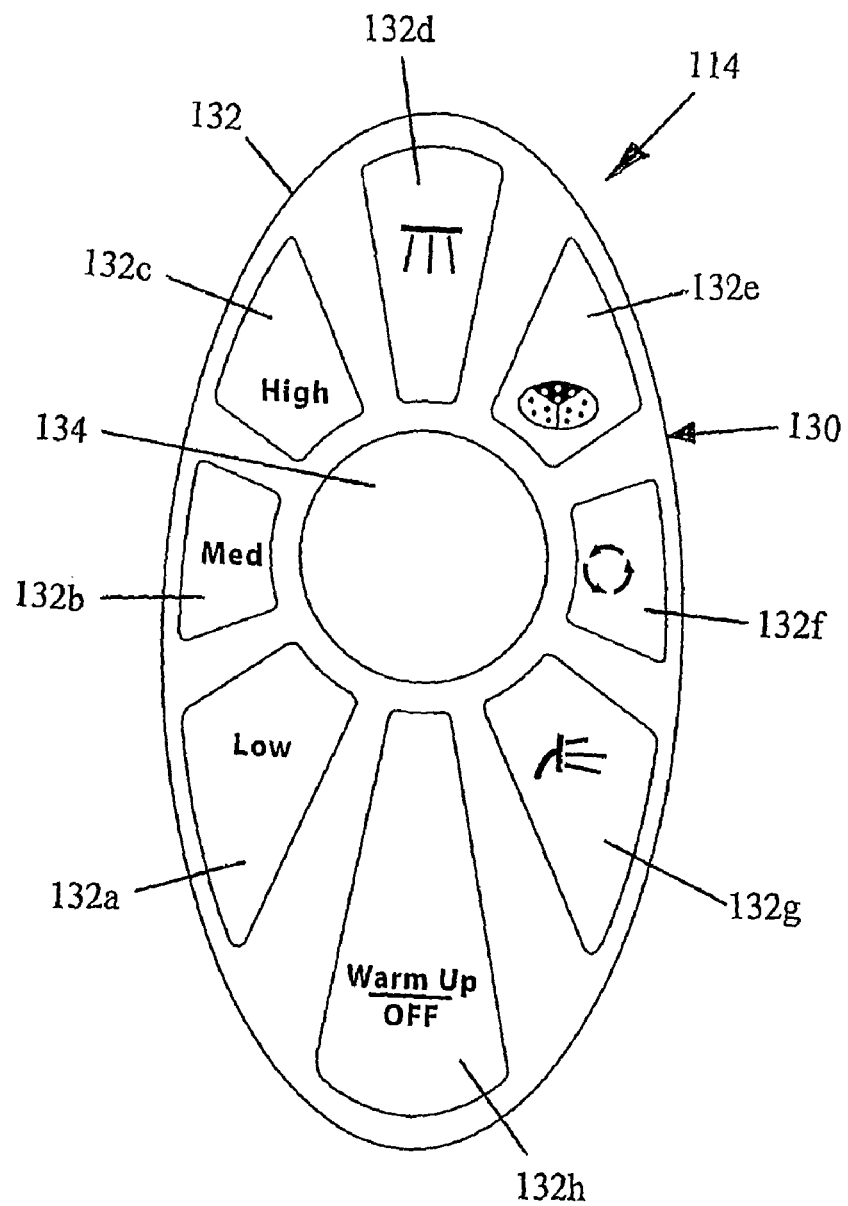
FIG. 24 is a schematic view of a user interface for two outlets.

Thus, referring now to FIG. 24, there is shown a user interface 114 suitable for controlling a shower in the home or a hotel. The interface 114 comprises a wall mounted control panel 130 with push button switches 132 for different functions and a rotary knob 134 to select outlet water temperature. As shown there are three buttons 132a,b,c for selecting three different flow rates, four buttons 132d,e,f,g for selecting four different spray heads and a warm-up/off button 132h. In the 'off' state, the warm up/off button 132h is illuminated to indicate there is power to the valve and that the valve is in the "off" state.

A user operating the shower outlet can use any of the buttons 132 to switch on the valve 16 and start the water flowing at the temperature that the temperature knob 134 is set to. The symbols on the buttons 132 are illuminated to indicate which one is selected.

If the user starts the flow with any of the spray selection buttons 132*d,e,f,g*, a default flow rate, usually the medium flow rate set by button 132*b* is automatically selected and the user can increase or reduce the flow rate by pressing either of the buttons 132*a,c*.

If the user starts the flow with any of the flow selection buttons 132*a,b,c* a default shower outlet will automatically be used. For example, the unit may supply temperature controlled water to one or more of a fixed shower head, a handset and/or body jets.

If the user starts the valve with the warm-up/off button 132*h*, a default shower outlet and a default water flow rate are automatically selected. Usually the medium flow rate is selected, as described above. The water flow starts after a short delay to flush out all the outlets for a few seconds with warm water at the temperature set by the control knob 134 and then stops.

This delayed operation with paused flow in the warm-up position is particularly useful where the shower is located in an enclosure. Thus, the user can open a door (or curtain), press the warm up/off button 132*h* and close the door before the water flow starts. When the water warms up to the desired temperature, the water flow ceases, the user can open the door, enter the shower enclosure and close the door before starting the water flow by pressing any of the buttons 132*a,b,c,d,e,f, g,h* as described above without spraying water outside the enclosure.

The warm-up position is held for a few minutes, for example up to five minutes, whilst the shower and pipes etc remain quite warm. During this period, the mixing valve is held in a state of "suspended animation" in which the spool remains in the warm-up position. As a result, if the flow is re-started within this period, the mixing valve delivers the right temperature water straight away. If the flow is not re-started within this period, the mixing valve automatically shuts down and returns the spool to the full cold position so that on being started, the position of the spool is known and can be monitored as part of the control system for the valve.

A further function may be provided to allow the user to pause the water flow while showering for a few minutes, for example up to five minutes, by pressing the warm up/off button 132*h* during which time the mixing valve is again held in a state of "suspended animation" so that, when re-starting the flow within this period by pressing any button, the mixing valve again delivers the right temperature water straight away.

This pausing is particularly beneficial where the user wants to stop the flow to apply soap for body washing or shampoo for hair washing and then re-start the water flow to rinse off the soap/shampoo. The pause feature may also be used when two people need to use the shower one after the other where the flow can be paused to allow the first person to step out of the shower with the water flow off and the second person to step in before re-starting the water flow without spraying water outside the shower enclosure.

The above-described interface 114 may also include a memory and/or programming function to enable a range of additional features to be input for selection by the user when showering by modifying some of the button functions. For example by operating two or more buttons at once, preferably on opposite sides of the control panel 136 so that two hands are required, or in a coded sequence, operation of the valve can be modified as desired to provide any one or more of the following features:

1. Memory function to store preferred shower settings for selection when showering so that the valve automatically operates the shower according to the selected setting.
2. Programming function including the option for individuals to programme a shower setting for operation of the shower to provide temperature and/or flow profiles throughout the showering period.
3. Programming function to set a time limit for operation of the shower so that the shower turns off after a pre-determined time.
4. Programming function to disable the temperature and/or flow settings so that the shower can only be turned 'on' and 'off'.
5. Programming function to lock the operation of the shower completely so that the shower can only be turned "on" by an authorised user.
6. Programming function to set the maximum water temperature that can be selected to prevent users such as children, the elderly or patients, selecting a water temperature above that the set maximum.

Other features that could be employed with memory and programming functions will be apparent to those skilled in the art.

It will be understood that the invention is not limited to the embodiments above-described and that various modifications can be made without departing from the concepts described herein. For example, systems for large buildings or industrial applications may employ a circulation loop for supplying temperature controlled water to a large number of outlets at different locations. In these systems, the temperature of the cold water supply can change considerably with demand for temperature controlled water and a cold water temperature sensor may be provided in the inlet to the mixing valve to provide an input to the electronic controller to assist in the operation of the electric motor to control the mixing valve.

A by-pass may be provided between the hot and cold water inlets to the mixing valve that is closed for normal operation and is opened during the disinfection cycle so that the mixing valve is flushed with hot water entering through both inlets. In this condition, the valve spool adopts a position between the end positions to allow flow through the valve from both inlet plenum chambers. In a further modification, a flow control valve may be provided that is open for normal operation and is partially closed during the disinfection cycle to restrict flow thereby reducing the volume of hot water required to carry out the disinfection.

Other features, benefits and advantages of the invention in each of its aspect will be apparent to those skilled in the art. Thus, it will be appreciated that the invention provides a modular system where one mixing valve can be combined with different interface panels for application to a wide range of installations having different user requirements. In this way, one mixing valve can be readily set-up for use in a range of installations where previously a bespoke mixing valve may have been required for each installation. Moreover, it will be appreciated that any of the features described herein may be employed separately or in combination with any other feature and that the scope of the invention is to be construed accordingly to include all such arrangements.

The invention claimed is:

1. A method of disinfecting a water supply system for at least one ablutionary outlet comprising the steps of providing a mixing valve having an electronic controller for controlling the mixing valve, initiating a disinfection cycle by inputting a first signal followed by a second signal within a pre-determined time of inputting the first signal, supplying water from the mixing valve to the outlet at an elevated temperature above a pre-determined temperature after both of said first and second signals have been input for a time sufficient to kill bacteria in contact with water at the elevated temperature, recording the water temperature at pre-determined intervals during the disinfection cycle, storing the recorded temperature in a memory, and retrieving the information from the memory for display.

2. The method according to claim 1 including recording if the temperature drops below the pre-determined temperature during the disinfection cycle.

3. The method according to claim 1 including recording if the disinfection cycle exceeds a pre-determined time.

4. The method according to claim 1 including initiating the disinfection cycle via means separate from user operable means for user selection of water temperatures up to the pre-determined temperature.

5. The method according to claim 1 including aborting the disinfection cycle in response to detection of a person in or entering an area in which the outlet is located.

* * * * *